United States Patent
Kai et al.

(10) Patent No.: US 8,730,017 B2
(45) Date of Patent: May 20, 2014

(54) ANTENNA, TAG COMMUNICATION APPARATUS, AND READER-WRITER SYSTEM

(75) Inventors: Manabu Kai, Kawasaki (JP); Teruhisa Ninomiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 814 days.

(21) Appl. No.: 12/897,247

(22) Filed: Oct. 4, 2010

(65) Prior Publication Data

US 2011/0080271 A1  Apr. 7, 2011

(30) Foreign Application Priority Data

Oct. 5, 2009  (JP) ................................ 2009-231392

(51) Int. Cl.
*H04Q 5/22* (2006.01)

(52) U.S. Cl.
USPC .................... 340/10.51; 340/572.7; 343/895; 343/731

(58) Field of Classification Search
USPC ....................................................... 340/10.51
See application file for complete search history.

(56) References Cited

U.S. PATENT DOCUMENTS

| | | | |
|---|---|---|---|
| 7,159,775 B2* | 1/2007 | Aoki et al. | 235/451 |
| 7,557,757 B2* | 7/2009 | Deavours et al. | 343/700 MS |
| 8,077,115 B2* | 12/2011 | Yamada et al. | 343/895 |
| 2005/0057422 A1 | 3/2005 | Deguchi et al. | |
| 2006/0132361 A1 | 6/2006 | Lee | |
| 2007/0159333 A1* | 7/2007 | Deguchi | 340/572.7 |
| 2007/0290940 A1* | 12/2007 | Maniwa et al. | 343/810 |
| 2009/0219215 A1 | 9/2009 | Huber et al. | |

FOREIGN PATENT DOCUMENTS

| | | |
|---|---|---|
| JP | 2005-92699 | 4/2005 |
| JP | 2005-102101 | 4/2005 |
| JP | 2005-184318 A | 7/2005 |
| JP | 2007-88953 A | 4/2007 |
| JP | 2008-123231 A | 5/2008 |
| JP | 2009-118406 A | 5/2009 |
| WO | WO-2004-114241 A2 | 12/2004 |

OTHER PUBLICATIONS

Japanese Office Action mailed May 7, 2013 for corresponding Japanese Application No. 2009-231392, with Partial English-language Translation.
"Chinese Office Action" mailed by Chinese Patent Office and corresponding to Chinese application No. 201010282831.4 on Jan. 29, 2013, with English translation.
Extended European Search Report, dated Mar. 4, 2011 for corresponding European Application No. 10176271.4.

* cited by examiner

*Primary Examiner* — George Bugg
*Assistant Examiner* — Anthony D Afrifa-Kyei
(74) *Attorney, Agent, or Firm* — Fujitsu Patent Center

(57) ABSTRACT

A first antenna section included in an antenna has a first conductor, supplies electric power to a plurality of tags, and transmits electromagnetic waves to and receives electromagnetic waves from the plurality of tags. One end of the first conductor is a feeding point and an other end of the first conductor is an open end. The first conductor is connected to a reader-writer device for communicating with the plurality of tags. The first conductor can output electromagnetic waves. A second antenna section included in the antenna has a second conductor one end of which is a feeding point, an other end of which is an open end, and which is opposite to the first conductor of the first antenna section with the plurality of tags therebetween.

16 Claims, 25 Drawing Sheets

US 8,730,017 B2

ANTENNA, TAG COMMUNICATION APPARATUS, AND READER-WRITER SYSTEM

CROSS-REFERENCE TO RELATED APPLICATION(S)

This application is based upon and claims the benefit of priority of the prior Japanese Patent Application No. 2009-231392, filed on Oct. 5, 2009, the entire contents of which are incorporated herein by reference.

FIELD

The embodiments discussed herein are related to an antenna, a tag communication apparatus, and a reader-writer system.

BACKGROUND

In recent years RFID (Radio Frequency Identification) or the like for reading and writing information by radio communication has widely been used as a contactless automatic identification technique. With the RFID contactless data communication is performed by the use of radio waves (electromagnetic waves), for example, between a tag (RFID tag or the like) including a semiconductor memory and a reader-writer device for reading out data from and writing data to the semiconductor memory of the tag. With the RFID data communication is performed, for example, in the following way. The reader-writer device transmits radio waves to the RFID tag, information in the RFID tag is transmitted again to the reader-writer device by the use of radio waves, and the reader-writer device reads the information in the RFID tag transmitted.

A radio frequency used in the RFID belongs to the UHF band. A frequency of about 868 MHz is used in the EU (European Union), a frequency of about 915 MHz is used in the US (United States of America), and a frequency, of about 953 MHz is used in JP (Japan). Usually communication distance which can be realized in the case of using one RFID tag is about 3 to 5 m, but this distance depends on the minimum operating electric power of a chip used in the RFID tag.

FIG. 25 illustrates the structure of a RFID antenna. With the RFID, for example, a RFID antenna 900 illustrated in FIG. 25 is connected to a reader-writer device to perform communication between the reader-writer device and a RFID tag. With the RFID antenna 900, a patch antenna 902 for outputting radio waves is placed on an antenna plate 901 which is, for example, about 20×20 cm in size.

In addition, the following are known as a technique for transmitting and receiving information by the RFID.

Japanese Laid-open Patent Publication No. 2005-Japanese Laid-open Patent Publication No. 2008-123231

For example, however, if a plurality of RFID tags are adjacent to one another and therefore a plurality of RFID antennas are adjacent to one another, interference may occur. This causes a fall in the gain of an antenna or a change in impedance in a RFID tag. As a result, the state of matching between a chip and the antenna in the RFID tag may get worse, resulting in a shorter communication distance.

For example, it is assumed that papers or the like on which RFID tags are stuck are arranged at intervals of 1 to 2 mm. Even if the output of the reader-writer device is increased (to about 1 W, for example) and the RFID tags are brought as close to the reader-writer device as possible, there are cases where communication cannot be performed with any RFID tags stuck on the papers. If the output of the reader-writer device is limited to a range (about 10 dBm (10 mW), for example) in which legal restrictions are not imposed, it is even more difficult to perform communication. As stated above, when RFID tags stuck on papers managed by the RFID go into a state in which they are close to one another (they are arranged at intervals of several millimeters, for example), there are cases where communication with the RFID tags becomes difficult.

In addition, with the above patch antenna 902 bandwidth which can usually be used is about 20 MHz. Accordingly, with a reader-writer device used in the EU, the US, or JP, a dedicated patch antenna corresponding to a RFID tag frequency specified in the EU, US, or JP standards is needed. Some RFID tags can accommodate all of the RFID tag frequencies specified in the EU, US, and JP standards. However, such RFID tags may be, for example, about 100×20 mm in size. This size does not make handling easy. Such RFID tags may not be very practical at the time of attaching, depending on the size of articles to be managed. Furthermore, when such RFID tags are close to one another, their wide band characteristics are lost.

SUMMARY

According to an aspect of the present invention, there is provided an antenna including a first antenna section which has a first conductor, supplies electric power to a plurality of tags, and transmits electromagnetic waves to and receives electromagnetic waves from the plurality of tags, one end of the first conductor being a feeding point, an other end of the first conductor being an open end, the first conductor being connected to a reader-writer device for communicating with each tag, and the first conductor being able to output electromagnetic waves; and a second antenna section having a second conductor one end of which is a feeding point, an other end of which is an open end, and which is opposite to the first conductor of the first antenna section with the plurality of tags therebetween.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

DESCRIPTION OF EMBODIMENT(S)

Figure 1:
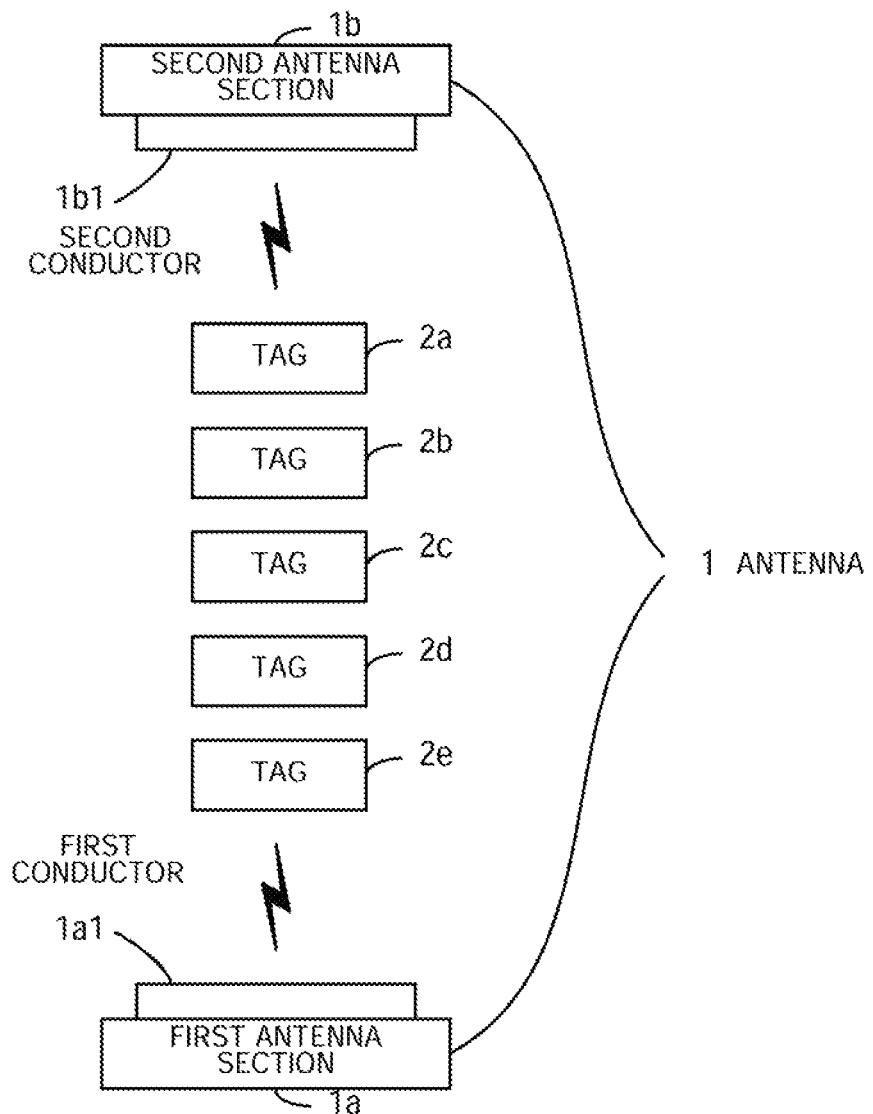
FIG. 1 illustrates a first embodiment.

Embodiments will now be described with reference to the accompanying drawings, wherein like reference numerals refer to like elements throughout.

First Embodiment

FIG. 1 illustrates a first embodiment. An antenna 1 illustrated in FIG. 1 supplies electric power to a plurality of (five, for example) tags 2a through 2e by electromagnetic field coupling and performs communication for reading out information from and writing information to the tags 2a through 2e. The antenna 1 includes a first antenna section 1a and a second antenna section 1b. The first antenna section 1a includes a first conductor 1a1. The second antenna section 1b includes a second conductor 1b1.

The first antenna section 1a includes the first conductor 1a1 one end of which is a feeding point and the other end of which is an open end. The first conductor is connected to a reader-writer device (not illustrated) for communicating with each tag and can output radio waves (electromagnetic waves). The first antenna section 1a supplies electric power to the plurality of tags by electromagnetic field coupling and transmits electromagnetic waves to and receives electromagnetic waves from the plurality of tags. The first conductor 1a1 emits electromagnetic waves toward the tags 2a through 2e on the basis of a signal from the reader-writer device. In addition, the first conductor 1a1 receives electromagnetic waves transmitted from the tags 2a through 2e, and transmits signals based on the received electromagnetic waves to the reader-writer device.

The second antenna section 1b includes the second conductor 1b1 one end of which is a feeding point and the other end of which is an open end. The second conductor 1b1 is opposite to the first conductor 1a1 of the first antenna section 1a with the plurality of tags therebetween.

Each of the tags 2a through 2e has the functions of storing information, obtaining its supply of electric power by an antenna (not illustrated) included therein, and performing radio communication such as the RFID. Each of the tags 2a through 2e can perform at least one of reading information stored and writing information to be stored by performing radio communication with the antenna 1.

As a result, by supplying electric power necessary for operation to the plurality of tags which are close to one another, the antenna 1 can communicate with the plurality of tags.

Preferably, the shape of the first conductor 1a1 and the second conductor 1b1 corresponds to that of an antenna included in each of the tags 2a through 2e with which the antenna 1 communicates. For example, if an antenna included in each of the tags 2a through 2e is an infinitesimal loop antenna, then the first conductor 1a1 and the second conductor 1b1 should have a spiral shape. If an antenna included in each of the tags 2a through 2e is an infinitesimal dipole antenna, then the first conductor 1a1 and the second conductor 1b1 should have the shape of a straight line.

In the above description the antenna 1 performs communication for reading out information from and writing information to the five tags 2a through 2e. However, the number of tags is not limited to five. Information may be read out from and written to six tags or more or four tags or less.

Furthermore, the antenna 1 performs communication for reading out information from and writing information to the tags 2a through 2e. However, the antenna 1 may perform communication only for reading out information from the tags 2a through 2e or only for writing information to the tags 2a through 2e.

Second Embodiment

A second embodiment will now be described.

Figure 2:
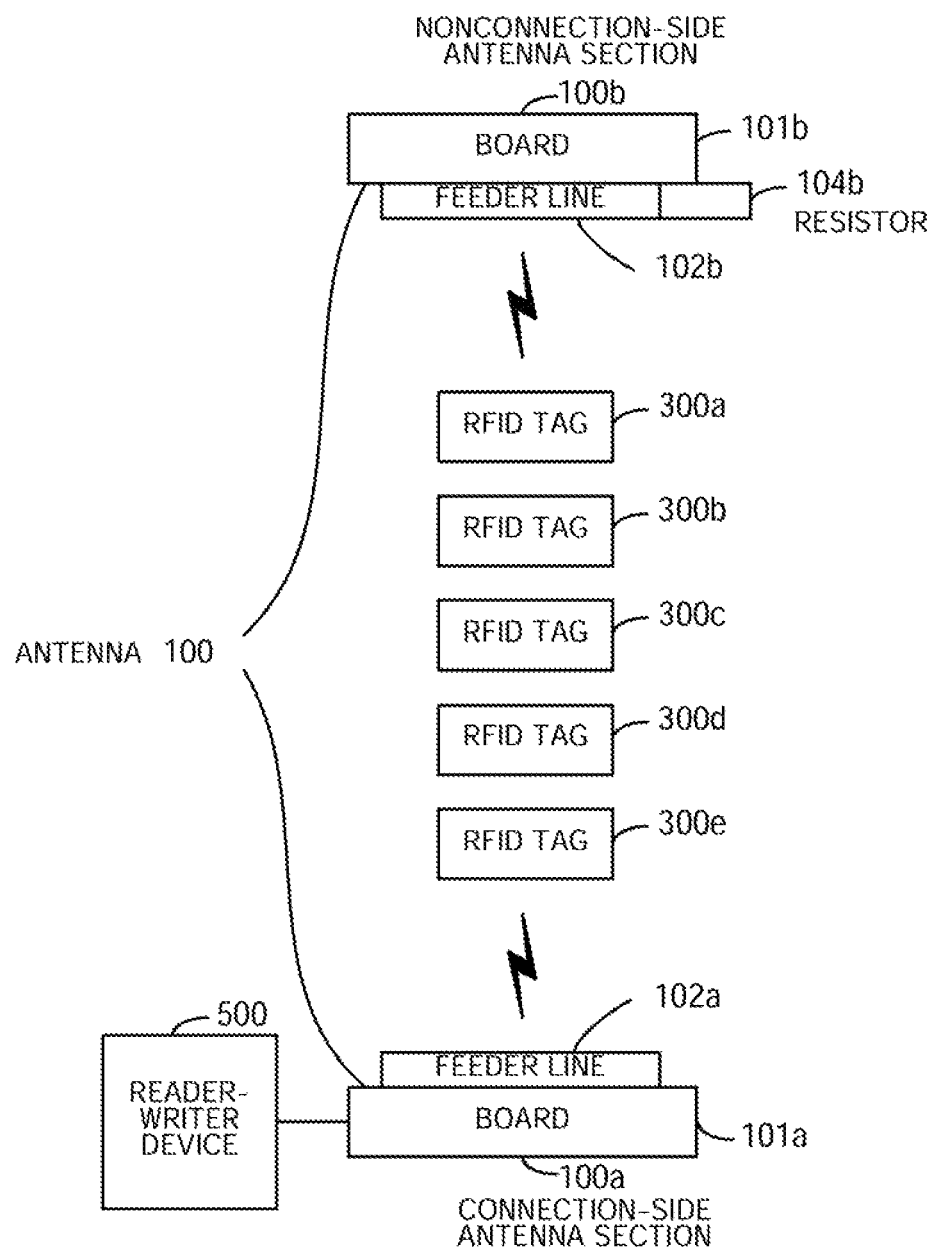
FIG. 2 is a block diagram of an antenna according to a second embodiment.

FIG. 2 is a block diagram of an antenna according to a second embodiment. An antenna 100 illustrated in FIG. 2 reads out and writes information by communicating with a plurality of RFID tags (RFID tags 300a through 300e, for example). In addition, the antenna 100 outputs electromagnetic waves in order to supply driving electric power to the RFID tags 300a through 300e. The antenna 100 is connected to a reader-writer device 500 via a matching circuit (not illustrated). The antenna 100 includes a connection-side antenna section 100a and a nonconnection-side antenna section 100b. The connection-side antenna section 100a includes a board 101a, a feeder line 102a, and GND (ground) which is not illustrated in FIG. 2 and which will be described later in FIG. 5. The nonconnection-side antenna section 100b includes a board 101b, a feeder line 102b, GND which is not illustrated in FIG. 2 and which will be described later in FIG. 7, and a resistor 104b.

One end of the feeder line 102a is a feeding point and the other end of the feeder line 102a is an open end. The feeder line 102a is connected to the reader-writer device 500 which communicates with each RFID tag, and outputs electromagnetic waves.

The board 101a is a dielectric and includes GND on a surface opposite to a surface on which the feeder line 102a is formed. The GND is connected to the feeder line 102a.

The feeder line 102a is a conductor pattern formed on the surface of the board 101a opposite to the RFID tags 300a through 300e. The feeder line 102a emits electromagnetic waves toward the RFID tags 300a through 300e on the basis of a signal from the reader-writer device 500. In addition, the feeder line 102a receives electromagnetic waves transmitted from the RFID tags 300a through 300e, and transmits a signal based on the received electromagnetic waves to the reader-writer device 500. The connection-side antenna section 100a supplies electric power to the RFID tags 300a through 300e by electromagnetic field coupling via the feeder line 102a and transmits electromagnetic waves to and receives electromagnetic waves from the RFID tags 300a through 300e.

One end of the feeder line 102b is a feeding point and the other end of the feeder line 102b is an open end. The feeder line 102b is opposite to the feeder line 102a of the connection-side antenna section 100a with the plurality of RFID tags therebetween. The feeder line 102b is a conductor pattern formed on a surface of the board 101b opposite to the RFID tags 300a through 300e. The board 101b is a dielectric and includes GND on a surface opposite to the surface on which the feeder line 102b is formed. The GND is connected to the feeder line 102b.

Preferably, the shape of the feeder line 102a and the feeder line 102b corresponds to that of an antenna included in each of the RFID tags 300a through 300e with which the antenna 100 communicates. In this embodiment an antenna included in each of the RFID tags 300a through 300e has the shape of a loop. Accordingly, the feeder line 102a and the feeder line 102b are formed so that they will have a spiral shape. In addition, the overall length of the feeder line 102a and the feeder line 102b each having a spiral shape is shorter than or equal to one wavelength of electromagnetic waves used by the antenna 100 for communicating with the RFID tags 300a through 300e.

Each of the RFID tags 300a through 300e performs radio communication with the reader-writer device 500. By doing so, information is written and read out. Each of the RFID tags 300a through 300e is a passive RFID tag and is driven by the received power of electromagnetic waves transmitted from the antenna 100 connected to the reader-writer device 500. Each of the RFID tags 300a through 300e communicates with the reader-writer device 500 by the use of electromagnetic waves in the UHF (Ultra High Frequency) band. For example, the 860-960 MHz band or the 2.45 GHz band is used as a frequency band in the UHF band. An equivalent circuit of each of the RFID tags 300a through 300e meets a resonance condition.

The reader-writer device 500 performs radio communication with the RFID tags 300a through 300e via the antenna 100 and writes information to and reads out information from the RFID tags 300a through 300e. For example, the RFID tags 300a through 300e are attached to articles to be managed. Information regarding the articles to be managed is written to the RFID tags 300a through 300e. Accordingly, the objects of management can be managed by reading out the information written to the RFID tags 300a through 300e.

In this embodiment the articles to be managed may be papers kept in a library or the like, various kinds of tickets including admission tickets, products managed as stock, parts and fittings necessary for manufacturing products, or the like. However, the articles to be managed are not limited to them. If objects can be managed by associating them with information, then they are the articles to be managed.

In this embodiment the case where information is read out from and written to the five RFID tags 300a through 300e will be described. However, the number of RFID tags is not limited to five. Information may be read out from and written to six RFID tags or more or four RFID tags or less.

Furthermore, the antenna 100 performs communication for reading out information from and writing information to the RFID tags 300a through 300e. However, the antenna 100 may perform communication only for reading out information from the RFID tags 300a through 300e or only for writing information to the RFID tags 300a through 300e.

Figure 3:
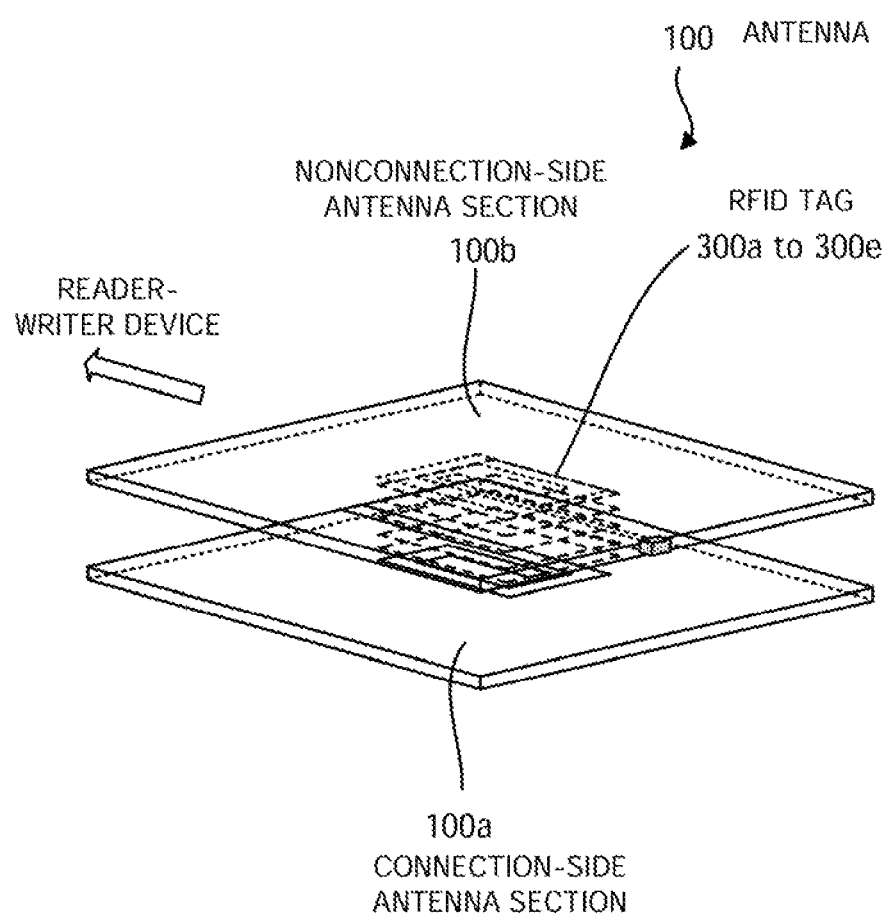
FIG. 3 illustrates the antenna and RFID tags according to the second embodiment.

FIG. 3 illustrates the antenna and the RFID tags according to the second embodiment. In this embodiment, as illustrated in FIG. 3, communication is performed with the RFID tags 300a through 300e placed between the connection-side antenna section 100a connected to the above reader-writer device 500 and the nonconnection-side antenna section 100b not connected to the reader-writer device 500.

Figure 4:
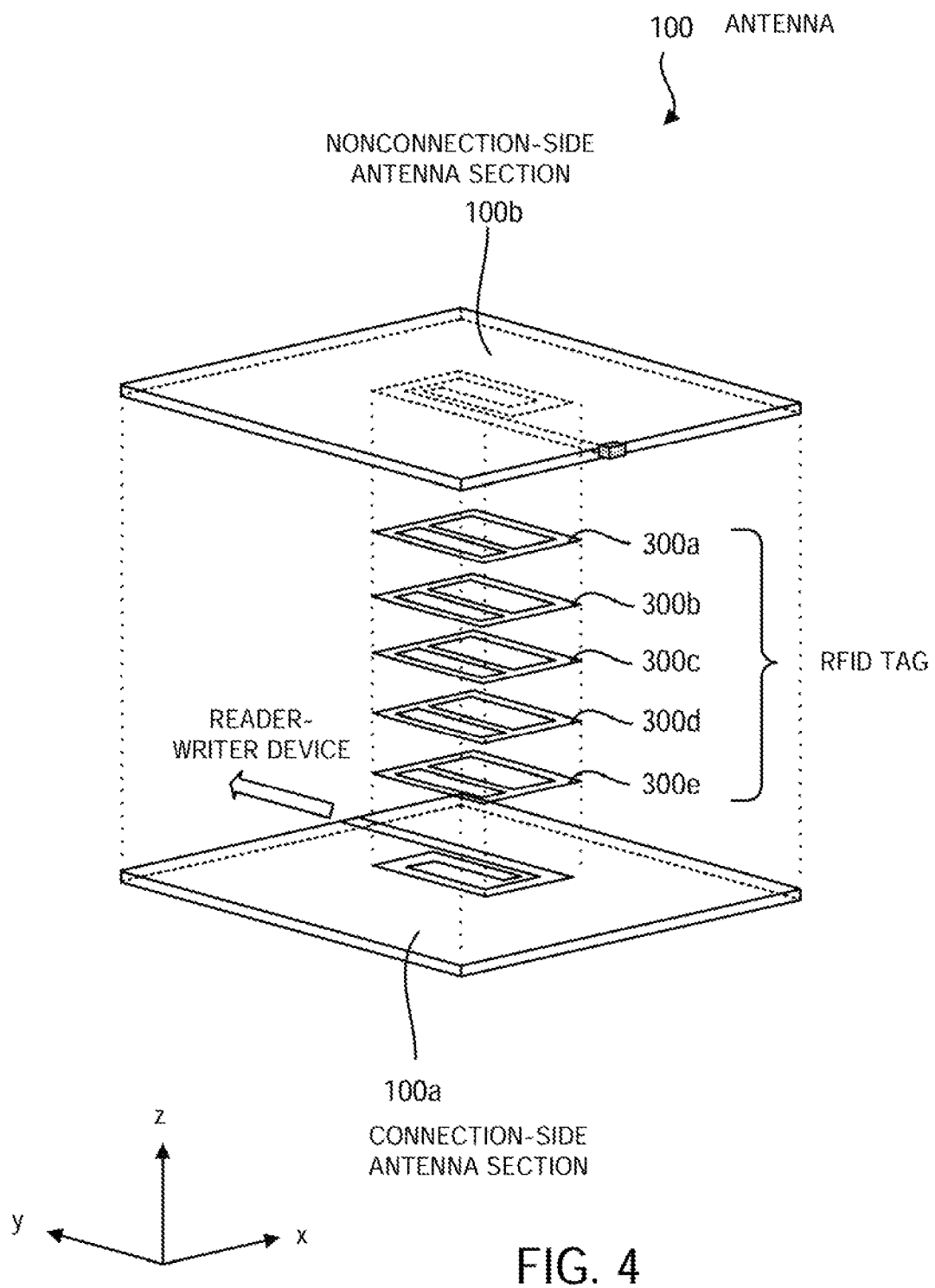
FIG. 4 is an exploded view of the antenna and the RFID tags according to the second embodiment.

FIG. 4 is an exploded view of the antenna and the RFID tags according to the second embodiment. In this embodiment, as illustrated in FIG. 4, the antenna 100 performs radio communication at communication time in a state in which the RFID tags 300a through 300e are placed in parallel with the x-y plane of the FIG. 4 between the connection-side antenna section 100a and the nonconnection-side antenna section 100b at the same position on the x-y plane of the FIG. 4. In addition, at communication time the antenna 100 outputs electromagnetic waves in order to supply driving electric power to the RFID tags 300a through 300e.

In this embodiment, the connection-side antenna section 100a is placed on the lower side (on the negative side of the z-axis of FIG. 4). The nonconnection-side antenna section 100b is placed on the upper side (on the positive side of the z-axis of FIG. 4) so that it will be opposite to the connection-side antenna section 100a. However, the nonconnection-side antenna section 100b may be placed on the lower side and the connection-side antenna section 100a may be placed on the upper side. Furthermore, the connection-side antenna section 100a and the nonconnection-side antenna section 100b may be placed in any direction so that they will be opposite to each other.

Figure 5:
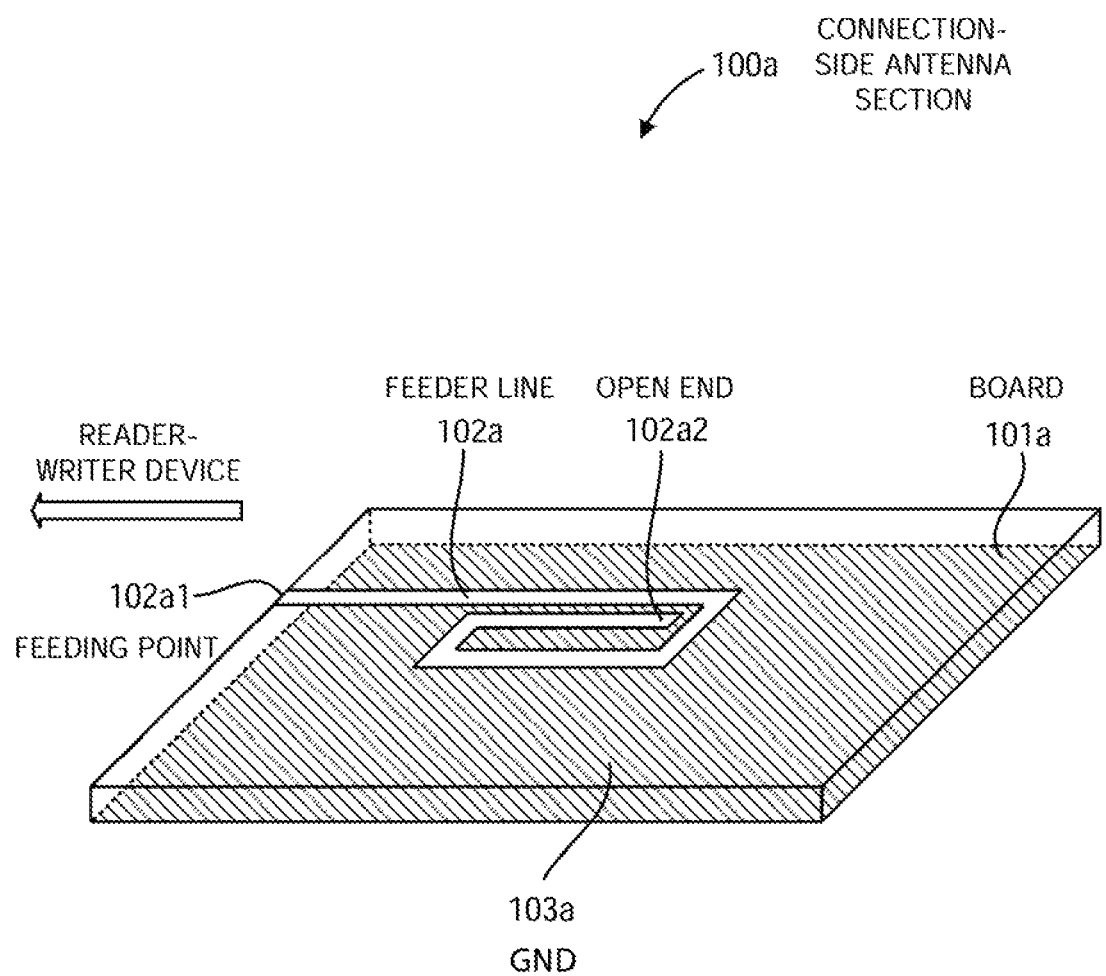
FIG. 5 illustrates a connection-side antenna section of the antenna according to the second embodiment.

FIG. 5 illustrates the connection-side antenna section of the antenna according to the second embodiment. As illustrated in FIG. 5, the connection-side antenna section 100a of the antenna 100 according to this embodiment includes the board 101a, the feeder line 102a, and GND 103a.

The board 101a is a dielectric of FR4 (glass epoxy resin having a relative permittivity $\in$r of 4.4 and a dielectric loss tangent tan δ of 0.02) or the like. The feeder line 102a is formed on the surface of the board 101a opposite to the RFID tags. One end of the feeder line 102a is a feeding point 102a1 and the other end of the feeder line 102a is an open end 102a2. The GND 103a is formed on the surface of the board 101a opposite to the surface on which the feeder line 102a is formed.

The connection-side antenna section 100a is connected via the feeding point 102a1 to the reader-writer device 500 which can communicate with the RFID tags. The RFID tags 300a through 300e with which the reader-writer device 500 communicates are then placed between the connection-side antenna section 100a and the nonconnection-side antenna section 100b of the antenna 100. The reader-writer device 500 transmits radio waves to and receives radio waves from the RFID tags 300*a* through 300*e* placed between the connection-side antenna section 100*a* and the nonconnection-side antenna section 100*b* via the antenna 100. By doing so, data is read out from and written to a semiconductor memory in a chip included in each of the RFID tags 300*a* through 300*e*.

Figure 6:
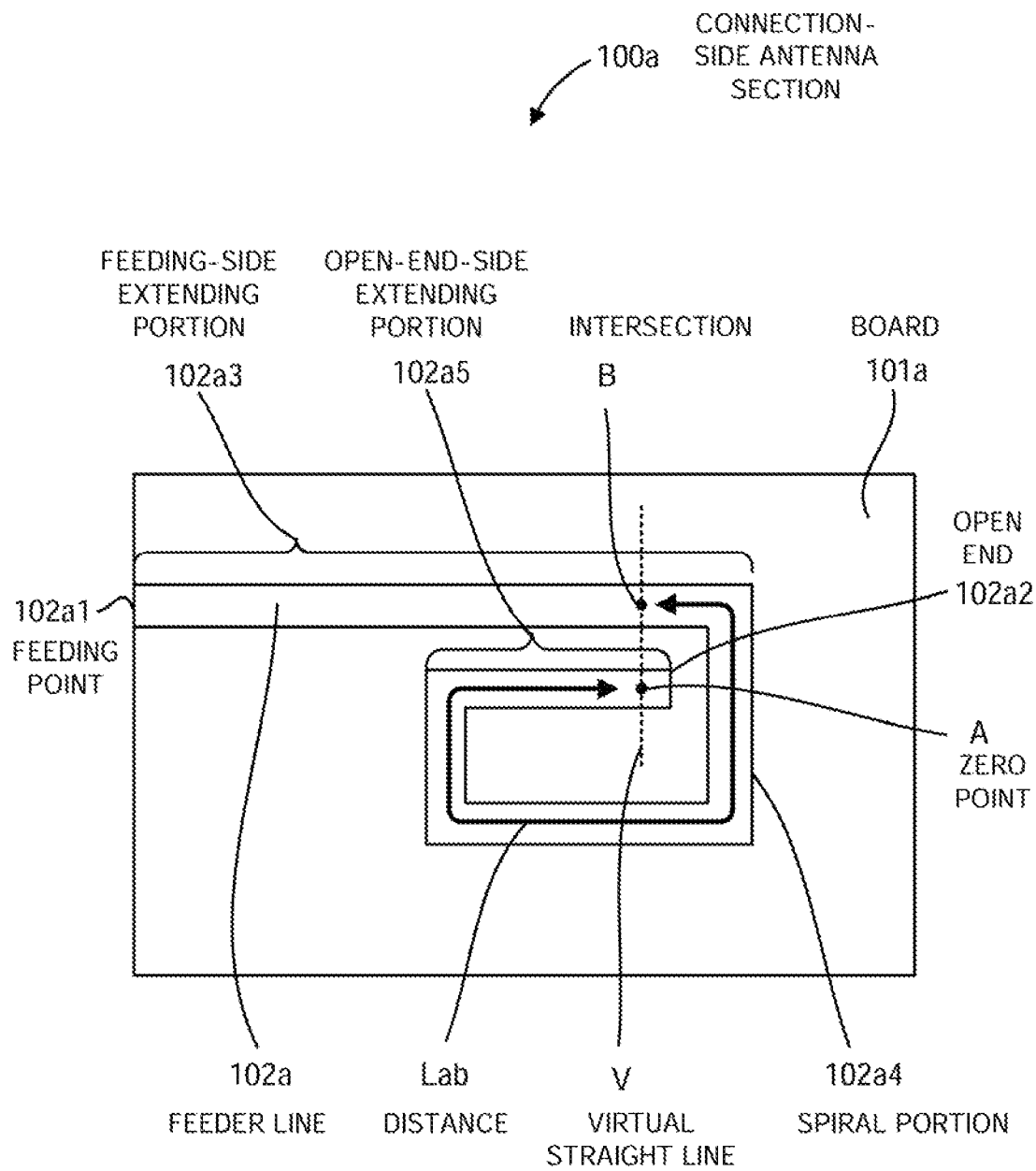
FIG. 6 illustrates a feeder line included in the connection-side antenna section of the antenna according to the second embodiment.

FIG. 6 illustrates the feeder line included in the connection-side antenna section of the antenna according to the second embodiment. In this embodiment, as illustrated in FIG. 6, the feeder line 102*a* includes a feeding-side extending portion 102*a*3 and a spiral portion 102*a*4 connected to the feeding-side extending portion 102*a*3. The feeder line 102*a* is formed by bending one linear conductor plural times.

The feeding-side extending portion 102*a*3 extends like a straight line from the feeding point 102*a*1 by determined distance. The spiral portion 102*a*4 extends spirally from an end portion of the feeding-side extending portion 102*a*3 opposite to the feeding point 102*a*1 to the open end 102*a*2 which is a terminal. In this embodiment, a tetragonal shape is adopted as a spiral shape. That is to say, the four sides of a tetragon are formed by bending the feeder line 102*a* which is a linear conductor four times. As stated above, an antenna included in each of the RFID tags 300*a* through 300*e* according to this embodiment is an infinitesimal loop antenna which is 19×19 mm in size. Accordingly, the feeder line 102*a* has a spiral shape so that sufficient coupling will be realized between the feeder line 102*a* and each RFID tag.

In addition, by connecting the spiral portion 102*a*4 having a spiral shape to the end portion of the feeding-side extending portion 102*a*3, the feeder line 102*a* can be made small compared with the case where the feeder line 102*a* is formed like a meandering line. As a result, an increase in the size of the entire antenna 100 can be controlled.

Furthermore, the spiral portion 102*a*4 has an open-end-side extending portion 102*a*5 which is formed on the open end 102*a*2 side, which includes the open end 102*a*2, and which is placed in a parallel state with respect to the feeding-side extending portion 102*a*3. "the open-end-side extending portion 102*a*5 is placed in a parallel state with respect to the feeding-side extending portion 102*a*3" means that the feeding-side extending portion 102*a*3 and the open-end-side extending portion 102*a*5 are placed in a state in which they are next to each other at determined distance, and also means that the feeding-side extending portion 102*a*3 and the open-end-side extending portion 102*a*5 are placed so as to be in parallel with each other. In this embodiment, the feeding-side extending portion 102*a*3 and the open-end-side extending portion 102*a*5 are placed in a parallel state so that a strong electric field will be generated in a space between the feeding-side extending portion 102*a*3 and the open-end-side extending portion 102*a*5 at the time of supplying electric power to the feeding point 102*a*1.

The operation of the connection-side antenna section 100*a* performed at the time of supplying electric power to the antenna 100 according to this embodiment will now be described. When the reader-writer device 500 supplies electric power to the feeding point 102*a*1, an electric current becomes zero near the open end 102*a*2. Accordingly, a zero point A at which an electric current becomes zero appears on the open end 102*a*2 side of the open-end-side extending portion 102*a*5. A virtual straight line V which passes through the zero point A and which is perpendicular to the open-end-side extending portion 102*a*5 is defined.

In this embodiment, distance Lab along the length of the feeder line 102*a* between an intersection B of the virtual straight line V and the feeding-side extending portion 102*a*3 and the zero point A is set so that the strength of an electric field obtained by composing electric fields which are generated at the zero point A and the intersection B at the time of supplying electric power will increase to a level at which the connection-side antenna section 100*a* can communicate with the RFID tags 300*a* through 300*e* placed on the board 101*a*.

To be concrete, the distance Lab along the length of the feeder line 102*a* of the connection-side antenna section 100*a* between the zero point A and the intersection B is set to half of wavelength λ of radio waves used by the antenna 100 according to this embodiment, and therefore is shorter than the wavelength λ. In this case, the wavelength λ of the radio waves used by the antenna 100 is a value obtained by taking the influence of a wavelength compression effect by the relative permittivity ∈r of the used dielectric on the wavelength of the used radio waves in free space into consideration. Usually the wavelength λ of the radio waves used by the antenna 100 is influenced by the relative permittivity ∈r of the board 101*a* on which the feeder line 102*a* is formed. Accordingly, the wavelength λ of the radio waves used by the antenna 100 is shorter than the wavelength of the used radio waves in the free space. The wavelength of the used radio waves in the free space is compressed into about $1/(\in r)^{1/2}$ on the feeder line 102*a*. However, this depends on the thickness of the board 101*a*.

For example, if the used radio waves are in the UHF band (frequency is, for example, about 952 MHz) and the board 101*a* is made of FR4 having a relative permittivity ∈r of 4.4, the wavelength in the free space is about 31 cm and the wavelength λ of the radio waves used by the antenna 100 is about 15 cm on the feeder line 102*a*. Therefore, the distance Lab along the length of the feeder line 102*a* between the zero point A and the intersection B is set to λ/2 (=about 7.5 cm).

By setting the distance Lab along the length of the feeder line 102*a* between the zero point A and the intersection B in this way to half of the wavelength λ of the radio waves used by the antenna 100, the phase of an electric current at the intersection B shifts by 180° from the phase of an electric current at the zero point A.

Figure 7:
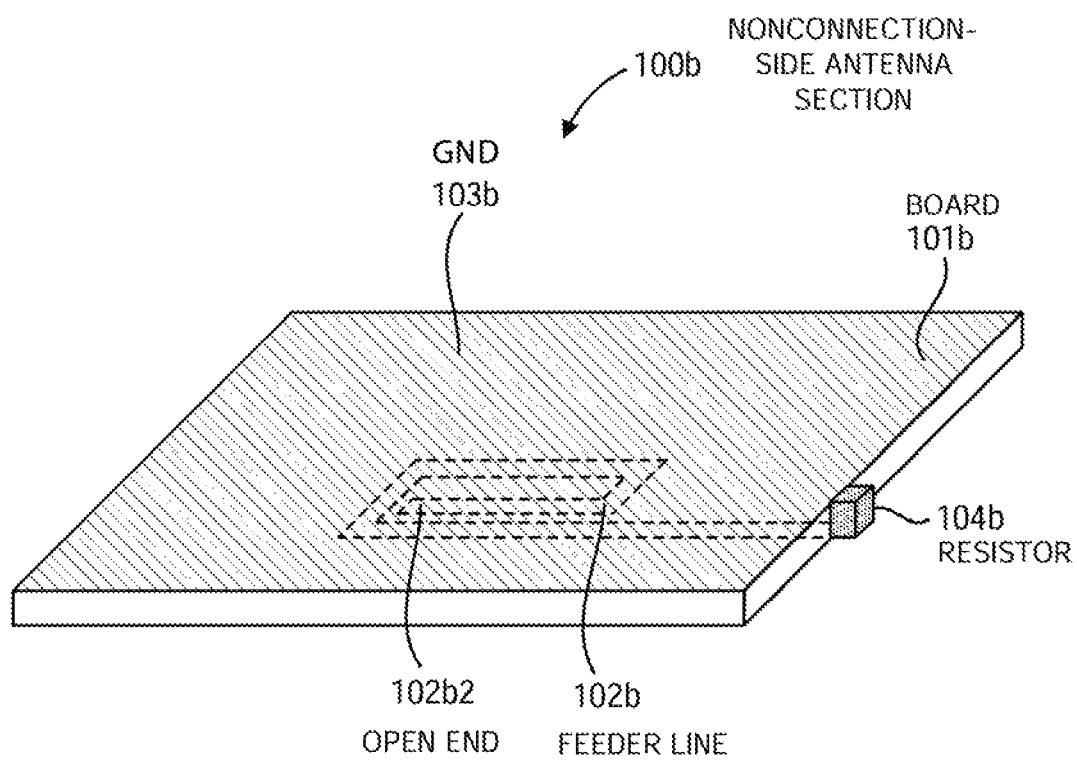
FIG. 7 illustrates a nonconnection-side antenna section of the antenna according to the second embodiment.

FIG. 7 illustrates the nonconnection-side antenna section of the antenna according to the second embodiment. As illustrated in FIG. 7, the nonconnection-side antenna section 100*b* of the antenna 100 according to this embodiment includes the board 101*b*, the feeder line 102*b*, GND 103*b*, and the resistor 104*b*.

The board 101*b* is a dielectric of FR4 or the like. This is the same with the board 101*a* of the connection-side antenna section 100*a*. The feeder line 102*b* is formed on the surface of the board 101*b* opposite to the RFID tags. The resistor 104*b* for termination is connected to one end of the feeder line 102*b* and the other end of the feeder line 102*b* is an open end 102*b*2. The GND 103*b* is formed on the surface of the board 101*b* opposite to the surface on which the feeder line 102*b* is formed. This is the same with the board 101*a* of the connection-side antenna section 100*a*.

The resistor 104*b* is, for example, a 50-ohm resistor and terminates the feeder line 102*b*. Electric power which is supplied from the connection-side antenna section 100*a*, which is transmitted to the RFID tags 300*e*, 300*d*, 300*c*, 300*b*, and 300*a* in that order, and which is finally transmitted to the feeder line 102*b* is consumed by the resistor 104*b*.

The nonconnection-side antenna section 100*b* transmits and receives radio waves in a state in which the RFID tags 300*a* through 300*e* are between the connection-side antenna section 100*a* and the nonconnection-side antenna section 100*b*. At this time the connection-side antenna section 100*a* is connected directly to the reader-writer device 500 which communicates with the RFID tags 300*a* through 300*e*. However, the nonconnection-side antenna section 100b is not connected directly to the reader-writer device 500.

Figure 8:
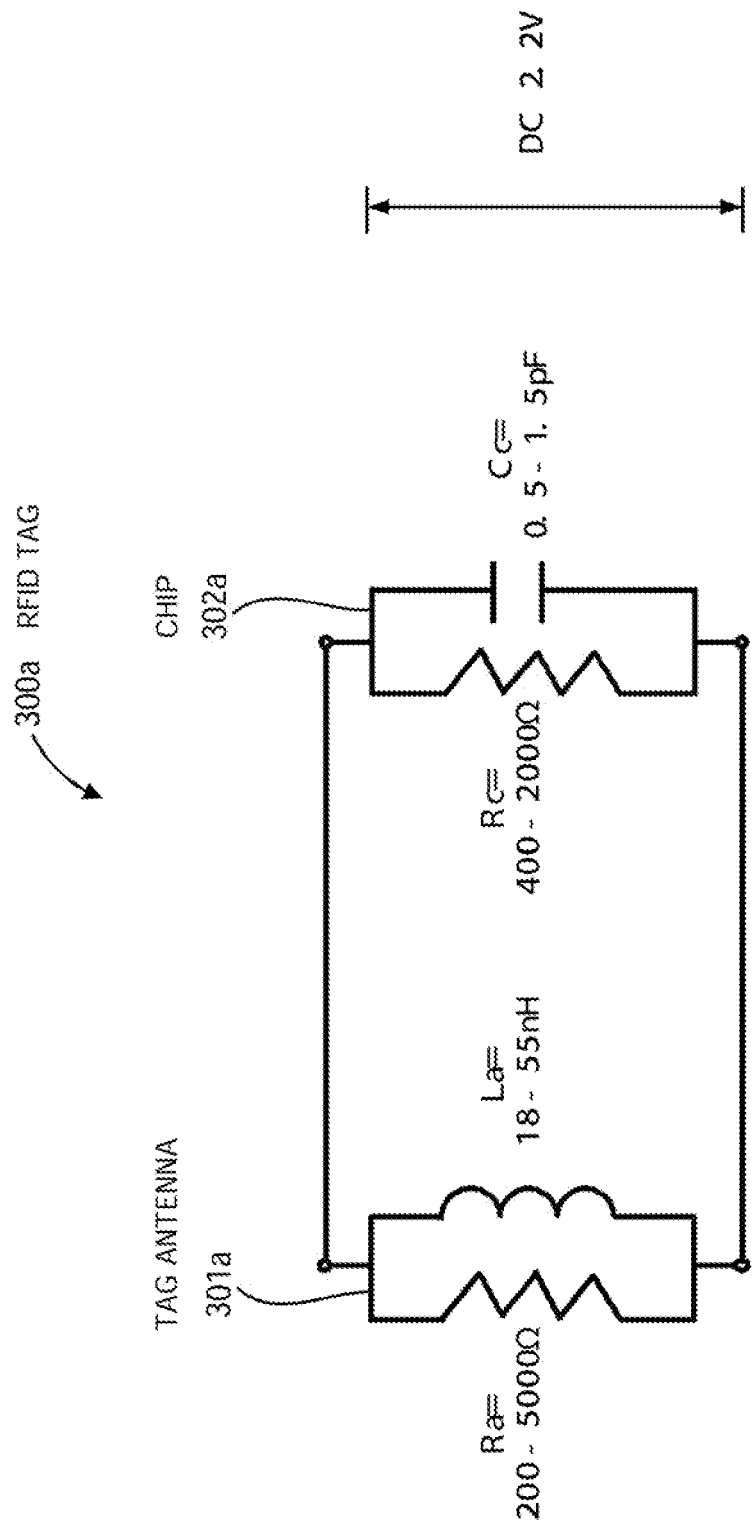
FIG. 8 illustrates an antenna and a chip included in the RFID tag according to the second embodiment.

FIG. 8 illustrates an antenna and a chip included in the RFID tag according to the second embodiment. A radio signal in the UHF band is used in a RFID system according to this embodiment. The reader-writer device 500 transmits a signal having determined power (about 1 W, for example). Each of the RFID tags 300a through 300e generates electric power for starting on the basis of the signal and returns a response signal to the reader-writer device 500 in response to command information included in the signal. As a result, information in each of the RFID tags 300a through 300e can be read out by the reader-writer device 500.

As illustrated in FIG. 8, the RFID tag 300a according to this embodiment includes a tag antenna 301a and a chip 302a which is a LSI chip and which is connected to the tag antenna 301a. The chip 302a operates at voltage (2.2 VDC, for example) supplied from the tag antenna 301a. An interface section of the chip 302a can be represented equivalently by a resistor Rc (having a resistance of, for example, 400 to 2,000Ω) and a capacitor Cc (having a capacitance of, for example, 0.5 to 1.5 pF) connected in parallel. In addition, the tag antenna 301a included in the RFID tag 300a can be represented equivalently by a radiation resistor Ra (having a resistance of, for example, 200 to 5,000Ω) and an inductor La (having an inductance of, for example, 18 to 55 nH) connected in parallel.

Furthermore, the RFID tag 300a according to this embodiment is designed so that the capacitance of the capacitor Cc, the inductance of the inductor La, and a used frequency f will meet a resonance condition indicated by the following (1).

$$f = \frac{1}{2\pi\sqrt{LaCc}} \quad (1)$$

In this case, by connecting the capacitor Cc and the inductor La of the RFID tag 300a in parallel, resonance occurs between the capacitor Cc having a capacitance value and the inductor La having an inductance value, and matching is realized. As a result, received electric power obtained by the tag antenna 301a can be supplied adequately to the chip 302a.

FIG. 8 illustrates the structure of the RFID tag 300a alone. However, the other RFID tags 300b through 300e can be realized by adopting the same structure.

FIGS. 9 through 13 illustrate the relationship between the operating frequency and gain of each RFID tag according to the second embodiment. FIGS. 9 through 13 indicate results obtained by calculating supply electric power Ptag1 through Ptag5 supplied to the RFID tags 300a through 300e, respectively, at the time of inputting input electric power Pin=10 dBm (no license is required in Japan at this electric power level) to the antenna 100 using the feeder lines according to this embodiment by the use of the electromagnetic field simulator HFSS (offered by Ansoft Japan K.K.). In this embodiment the five RFID tags 300a through 300e are used. Electric power supplied to these RFID tags is calculated. However, the number of RFID tags is not limited to five. Any number of RFID tags may be used.

It is assumed that if supply electric power Ptag supplied to a RFID tag exceeds minimum operating power, the RFID tag operates and can communicate with the reader-writer device 500 for transmitting and receiving information. The minimum operating power of a chip included in a RFID tag depends on product specifications and the like. Usually, however, the minimum operating power of a chip included in a RFID tag is about −9 to −14 dBm. In this embodiment, it is assumed that the minimum operating power of the chip is −12.5 dBm.

Figure 9:
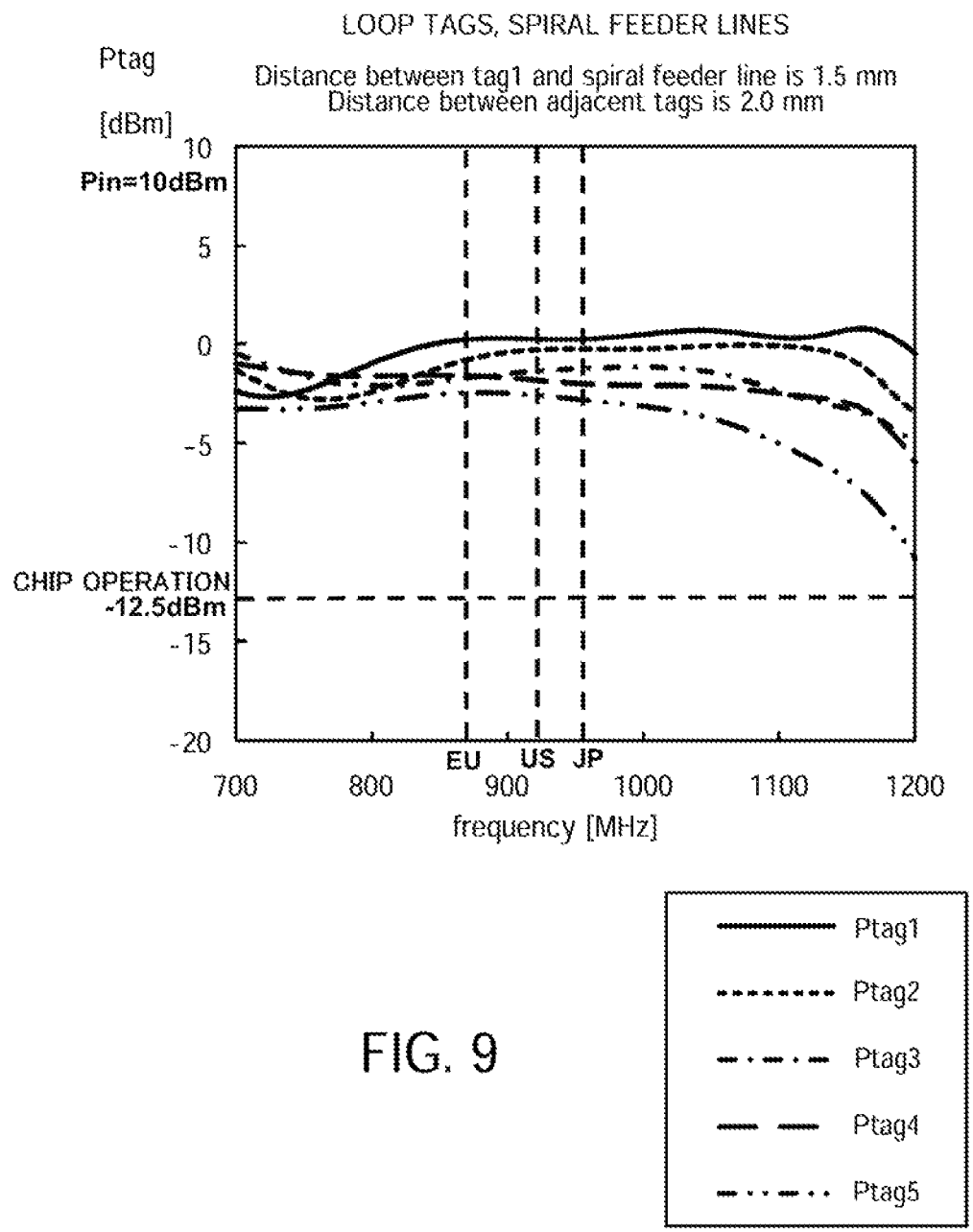
FIG. 9 illustrates the relationship between the operating frequency and gain of each RFID tag according to the second embodiment.

FIG. 9 indicates calculation results obtained in the case where the distance between the connection-side antenna section 100a and the RFID tag 300e is set to 1.5 mm, where the distance between the nonconnection-side antenna section 100b and the RFID tag 300a is set to 1.5 mm, and where the distance between adjacent RFID tags is set to 2 mm. As can be seen from FIG. 9, Ptag1 through Ptag5 are −4 to 0 dBm and a significantly large margin is left for each of Ptag1 through Ptag5 with respect to the minimum operating power.

In addition, Ptag1 through Ptag5 are approximately constant with respect to a frequency (horizontal axis) and a significantly large margin is left for each of Ptag1 through Ptag5 at any of the EU, US, and JP frequencies. Furthermore, if the RFID tags are attached to, for example, papers, the relative permittivity ∈r or thickness of the papers to which the RFID tags are attached may change. That is to say, the environment in which the RFID tags are used may change, so the frequency characteristics may shift. However, Ptag1 through Ptag5 are approximately constant with respect to a frequency, so the allowable dynamic range becomes wider even in such a case. For example, even if the frequency characteristics shift in the direction of an increase or decrease in frequency, the possibility that the RFID tags will function stably becomes stronger. Therefore, it is very useful for Ptag1 through Ptag5 to be approximately constant with respect to a frequency.

The calculation results are obtained by setting input electric power Pin inputted to the antenna 100 to 10 dBm and no license is required at this electric power level. However, if input electric power Pin inputted to the antenna 100 is set to 30 dBm (1 W), supply electric power Ptag1 through Ptag5 supplied to the RFID tags 300a through 300e, respectively, ranges from 17 to 20 dBm. That is to say, margins become larger and communication can be performed more easily. For example, the reader-writer device 500 can communicate with a large number of RFID tags.

Figure 10:
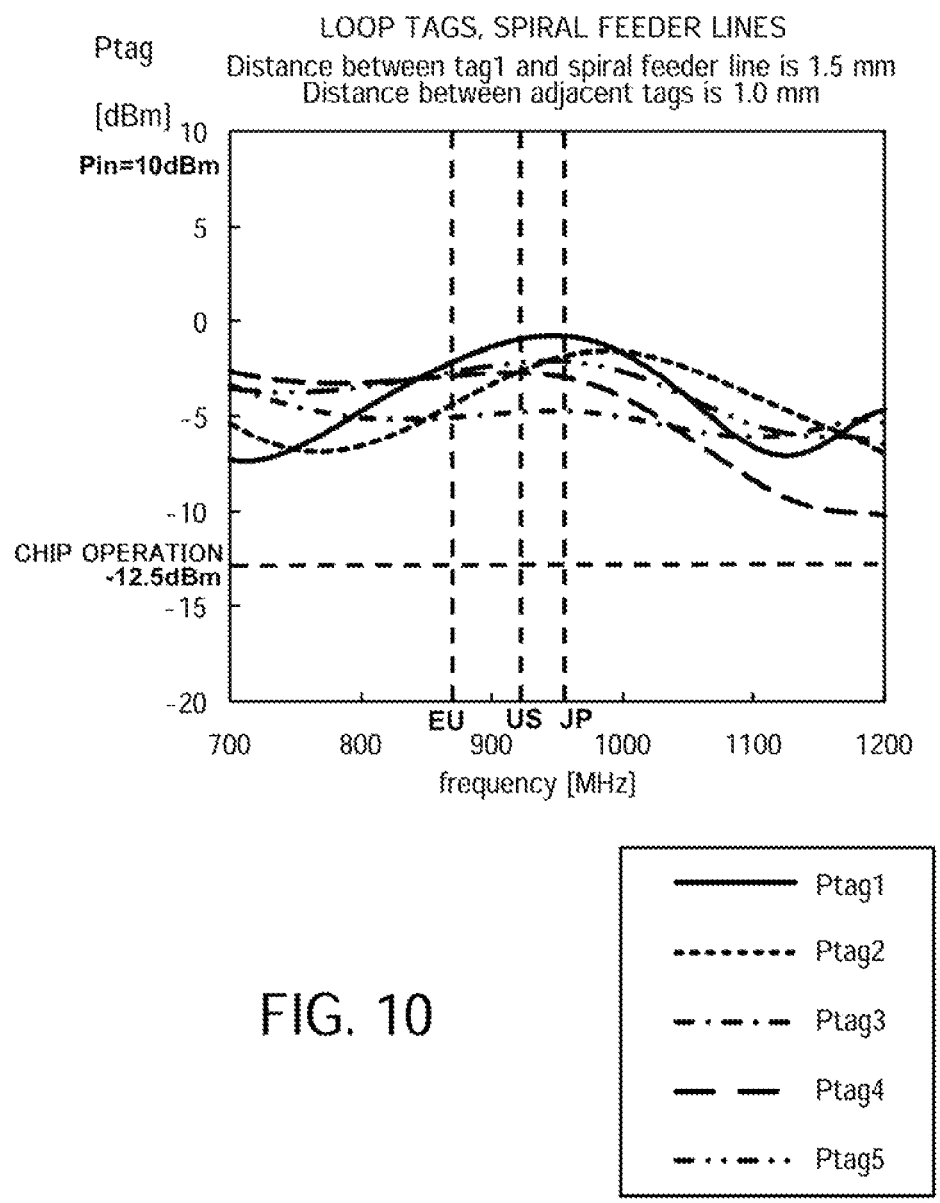
FIG. 10 illustrates the relationship between the operating frequency and gain of each RFID tag according to the second embodiment.
Figure 11:
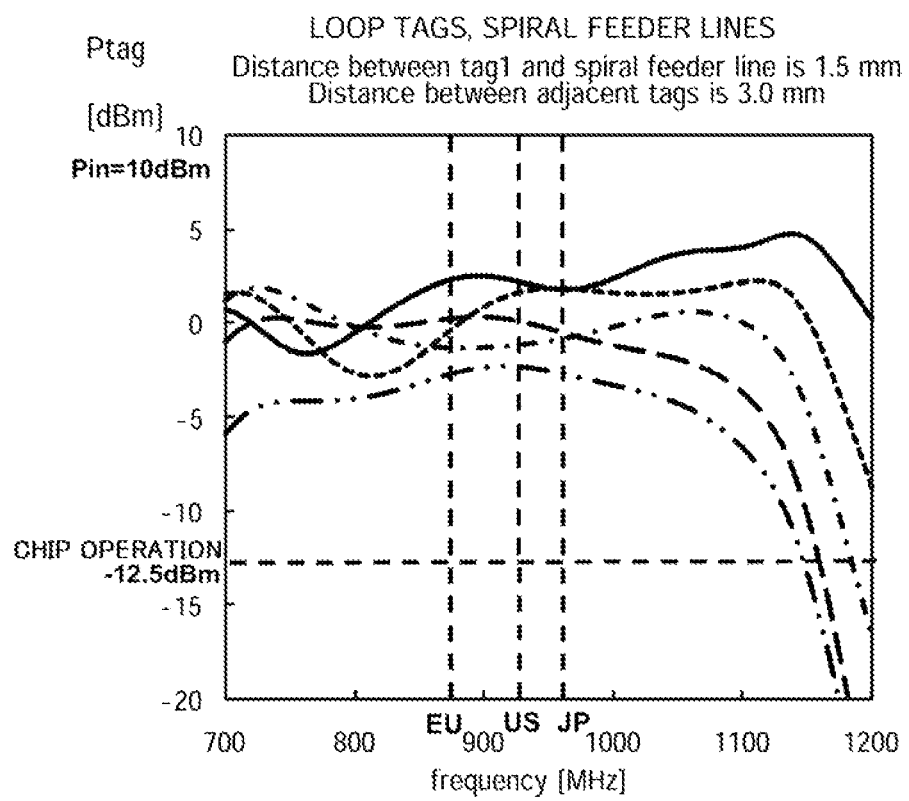
FIG. 11 illustrates the relationship between the operating frequency and gain of each RFID tag according to the second embodiment.
Figure 11:
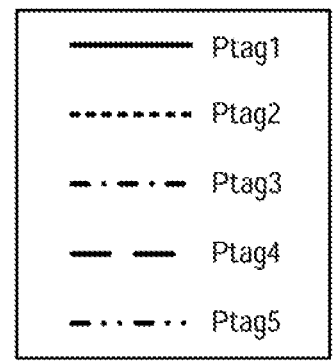
Figure 12:
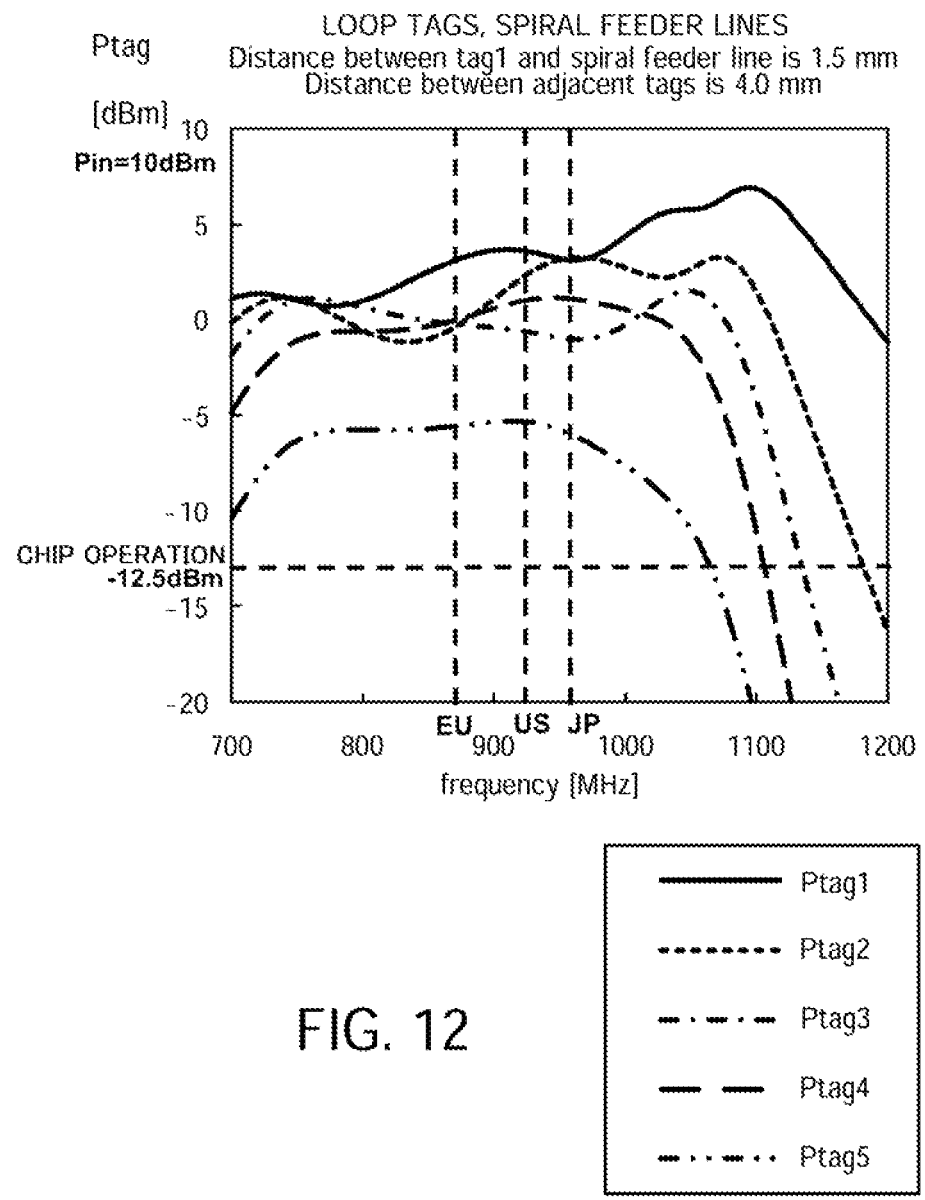
FIG. 12 illustrates the relationship between the operating frequency and gain of each RFID tag according to the second embodiment.
Figure 13:
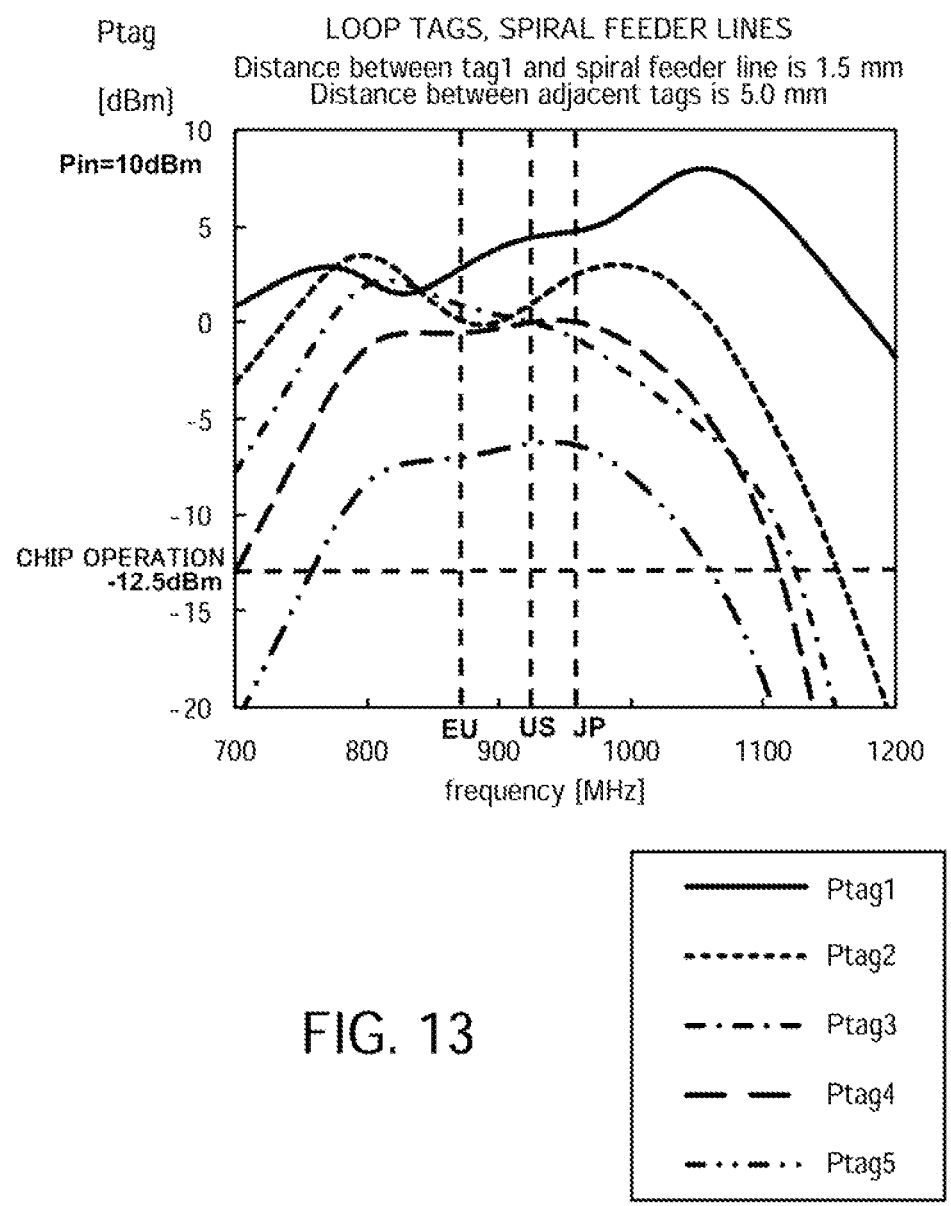
FIG. 13 illustrates the relationship between the operating frequency and gain of each RFID tag according to the second embodiment.

FIGS. 10 through 13 indicate calculation results obtained in the case where the distance between adjacent RFID tags is set to 1 mm, 3 mm, 4 mm, and 5 mm respectively. In the case of FIG. 10 in which the distance between adjacent RFID tags is set to 1 mm, supply electric power Ptag falls slightly due to interference between RFID tags. In the cases of FIGS. 11 through 13 in which the distance between adjacent RFID tags is set to 3 mm, 4 mm, and 5 mm respectively, on the other hand, as the distance between adjacent RFID tags becomes shorter, Ptag becomes higher and a frequency band which can properly be used becomes wider. This tendency also applies to the case of FIG. 9 in which the distance between adjacent RFID tags is set to 2 mm. The likely reason for this is that as the distance between adjacent RFID tags becomes shorter, more of electric power supplied from the feeder line 102a of the connection-side antenna section 100a is transmitted to the feeder line 102b of the nonconnection-side antenna section 100b and is consumed by the resistor 104b for termination. Accordingly, in this embodiment it is preferable that the distance between adjacent RFID tags should be set to 3 mm or less. In addition, in this embodiment RFID tags can be used in a state in which they are arranged at intervals of several millimeters. Therefore, RFID tags are applicable to, for example, the management of papers or bits of paper including tickets.

Figure 14:
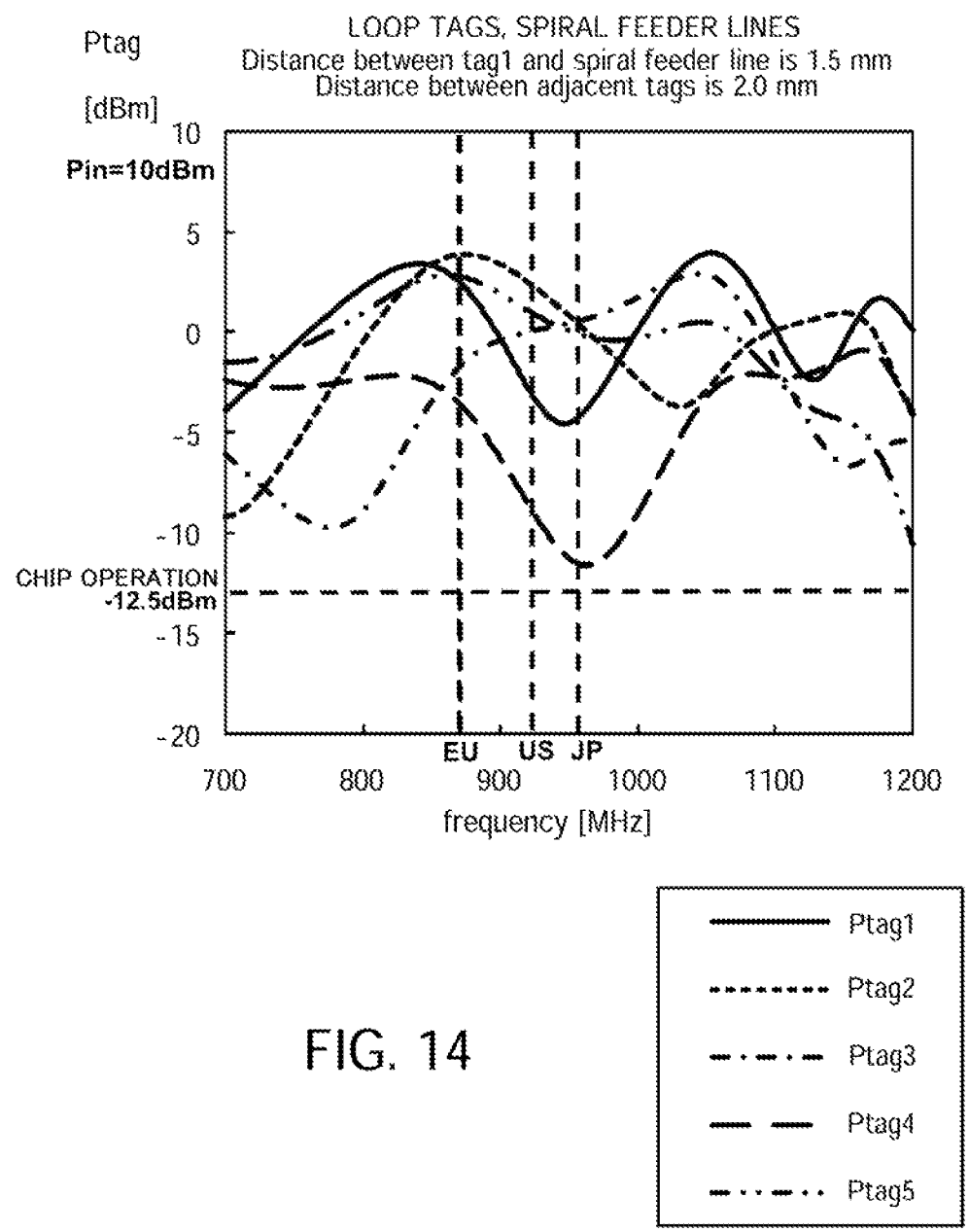
FIG. 14 illustrates the relationship between the operating frequency and gain of a RFID tag taken as an example for comparison.

FIG. 14 illustrates the relationship between the operating frequency and gain of a RFID tag taken as an example for comparison. FIG. 14 indicates calculation results obtained in the case where a resistor for terminating a feeder line 102b of a nonconnection-side antenna section 100*b* is not used. In this case, supply electric power Ptag1 through Ptag5 rises and falls significantly. Accordingly, electric power supplied to each RFID tag is unstable and the possibility that communication cannot be performed due to a change in environment becomes stronger. Therefore, in this embodiment the nonconnection-side antenna section 100*b* is placed opposite the connection-side antenna section 100*a* and the resistor 104*b* for termination is connected to the feeder line 102*b* of the nonconnection-side antenna section 100*b*.

Figure 15:
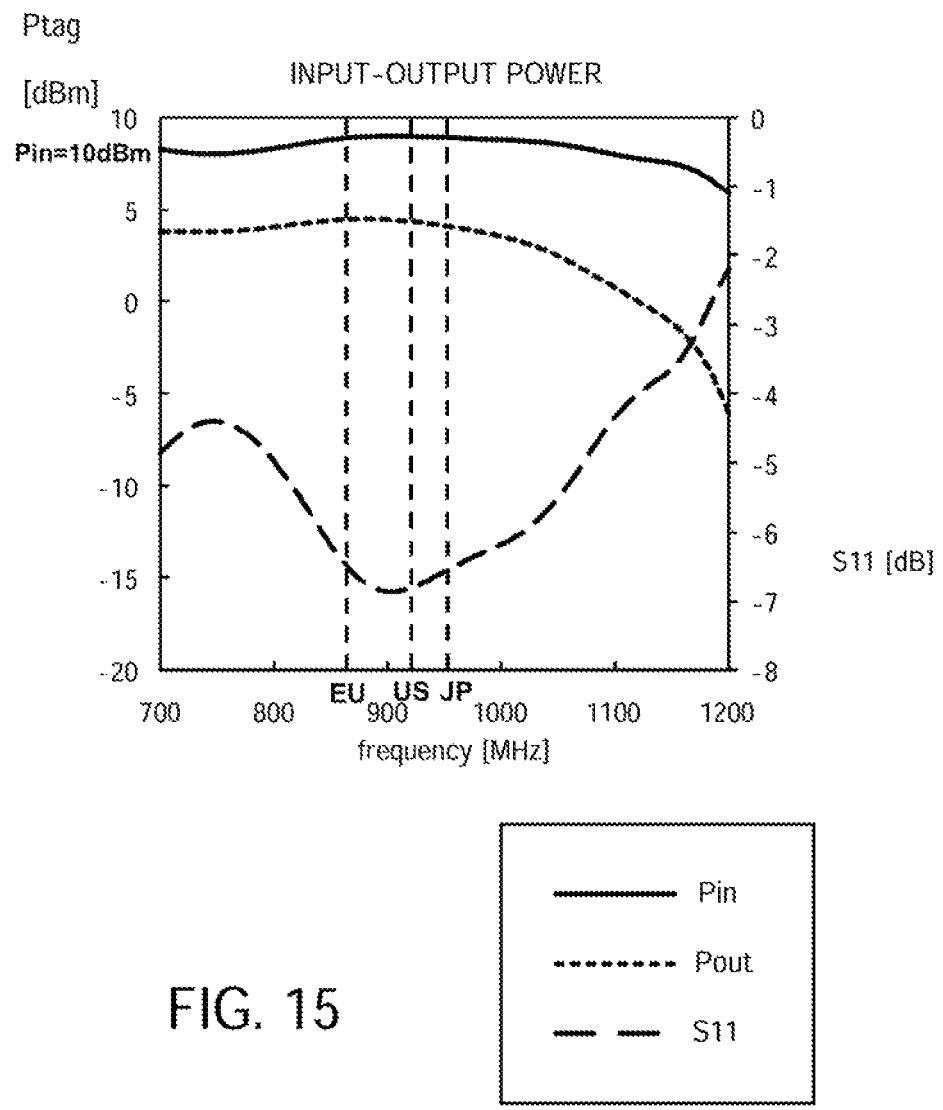
FIG. 15 illustrates the relationship between the operating frequency, gain, and reflection coefficient of the RFID tag according to the second embodiment.

FIG. 15 illustrates the relationship between the operating frequency, gain, and reflection coefficient of the RFID tag according to the second embodiment. FIG. 15 indicates the results of calculating input electric power Pin inputted from the feeder line 102*a* of the connection-side antenna section 100*a* according to this embodiment, output electric power Pout transmitted to the nonconnection-side antenna section 100*b* via the RFID tags 300*a* through 300*e*, and a reflection coefficient S11. In the case of FIG. 15, as indicated in FIG. 9, the distance between the connection-side antenna section 100*a* and the RFID tag 300*e* is set to 1.5 mm, the distance between the nonconnection-side antenna section 100*b* and the RFID tag 300*a* is set to 1.5 mm, and the distance between adjacent RFID tags is set to 2 mm.

In this case, the RFID tags 300*a* through 300*e* are close to one another and are in a state in which electric power is transmitted adequately by resonance. S11 is about −15 dB. An input electric power Pin of 9 dBm or more is inputted from the feeder line 102*a* and the output electric power Pout transmitted to the feeder line 102*b* is 4 to 5 dBm. That is to say, the RFID tags 300*a* through 300*e* are close to one another, so coupling between RFID tags is utilized. The input electric power Pin inputted from the feeder line 102*a* propagates through the RFID tags 300*a* through 300*e* which are resonating, is transmitted to the feeder line 102*b*, and is consumed by the resistor 104*b* for termination. At this time each of the RFID tags 300*a* through 300*e* acquires supply electric power sufficient for operation, so they can communicate with the reader-writer device 500. As a result, the reader-writer device 500 can read out information from and write information to all of the RFID tags 300*a* through 300*e*.

According to the second embodiment, as has been described, the RFID tags 300*a* through 300*e* are placed between the connection-side antenna section 100*a* and the nonconnection-side antenna section 100*b* of the antenna 100 and communication is performed. By doing so, electric power can stably be supplied to the RFID tags 300*a* through 300*e* at the same time and communication can be performed.

In addition, the RFID system according to the second embodiment is suitable to the case where information is read out from and written to the RFID tags 300*a* through 300*e* which are close to one another by the reader-writer device 500. For example, the RFID system according to the second embodiment is suitable for managing papers to which RFID tags are attached and which are arranged on a shelf or the like at intervals of several millimeters.

Furthermore, the RFID tags can operate even at a low input electric power level of 10 dBm. Therefore, the RFID system according to the second embodiment is advantageous from the viewpoint of legal regulation on radio and is easy to utilize.

Moreover, the RFID system can be used in a wide band with the frequency characteristic taken into consideration. Design can be performed so that the same RFID system can use any of the EU, US, and JP frequencies. There is no need to prepare a RFID system dedicated to each frequency. In addition, the influence of a change in ambient condition (relative permittivity ∈r, thickness, or the like of papers, for example) on the operation of the RFID system can be curbed.

Furthermore, a patch antenna, for example, which is generally used is expensive, but in this embodiment FR4 is used as an inexpensive material. Therefore, the costs can be reduced.

Third Embodiment

A third embodiment will now be described. The differences between the above second embodiment and the third embodiment will chiefly be described. The same components are marked with the same symbols and descriptions of them will be omitted.

The third embodiment differs from the second embodiment in that the positions of RFID tags attached to articles to be managed can be confirmed visually.

Figure 16:
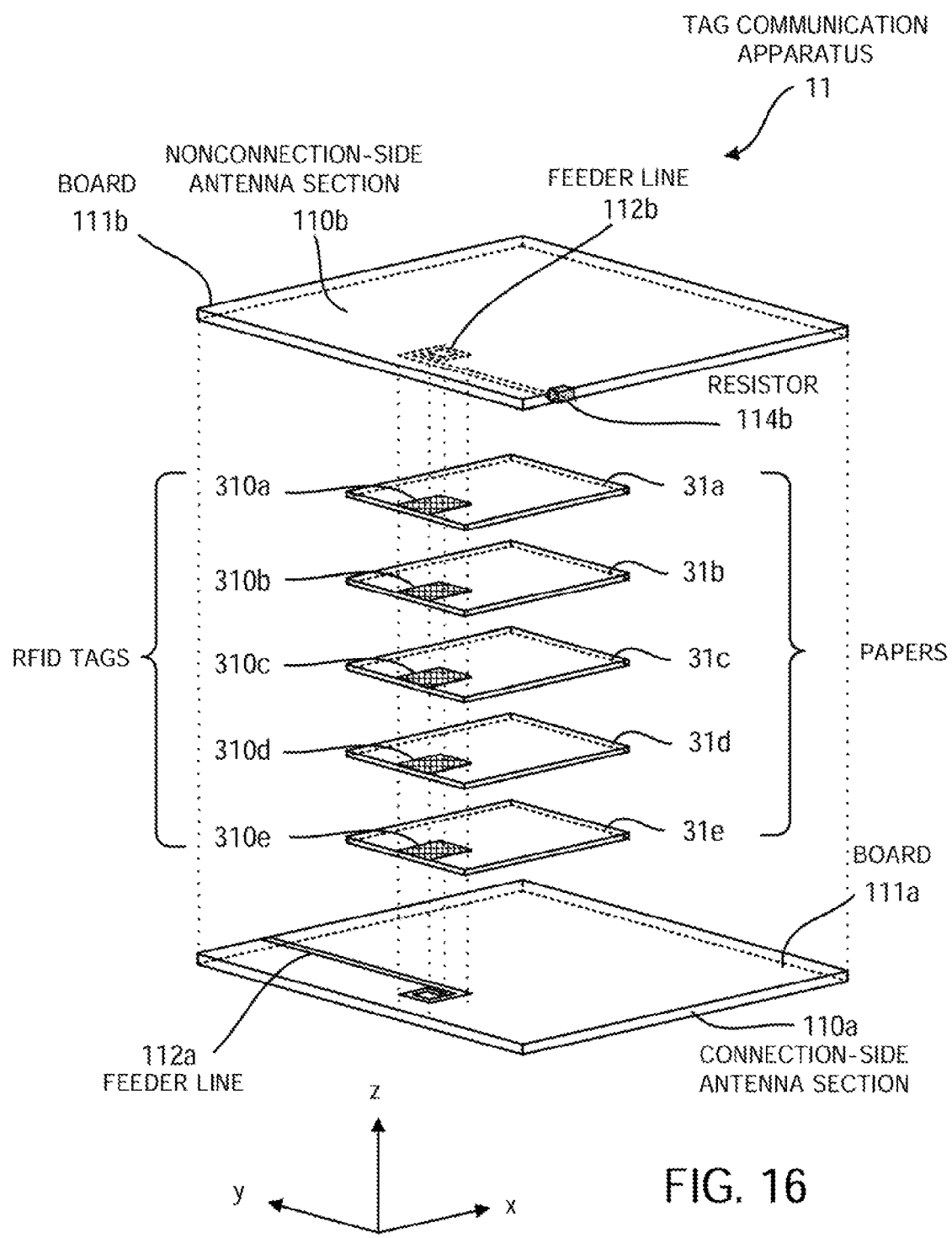
FIG. 16 illustrates a tag communication apparatus according to a third embodiment and objects of management.
Figure 17:
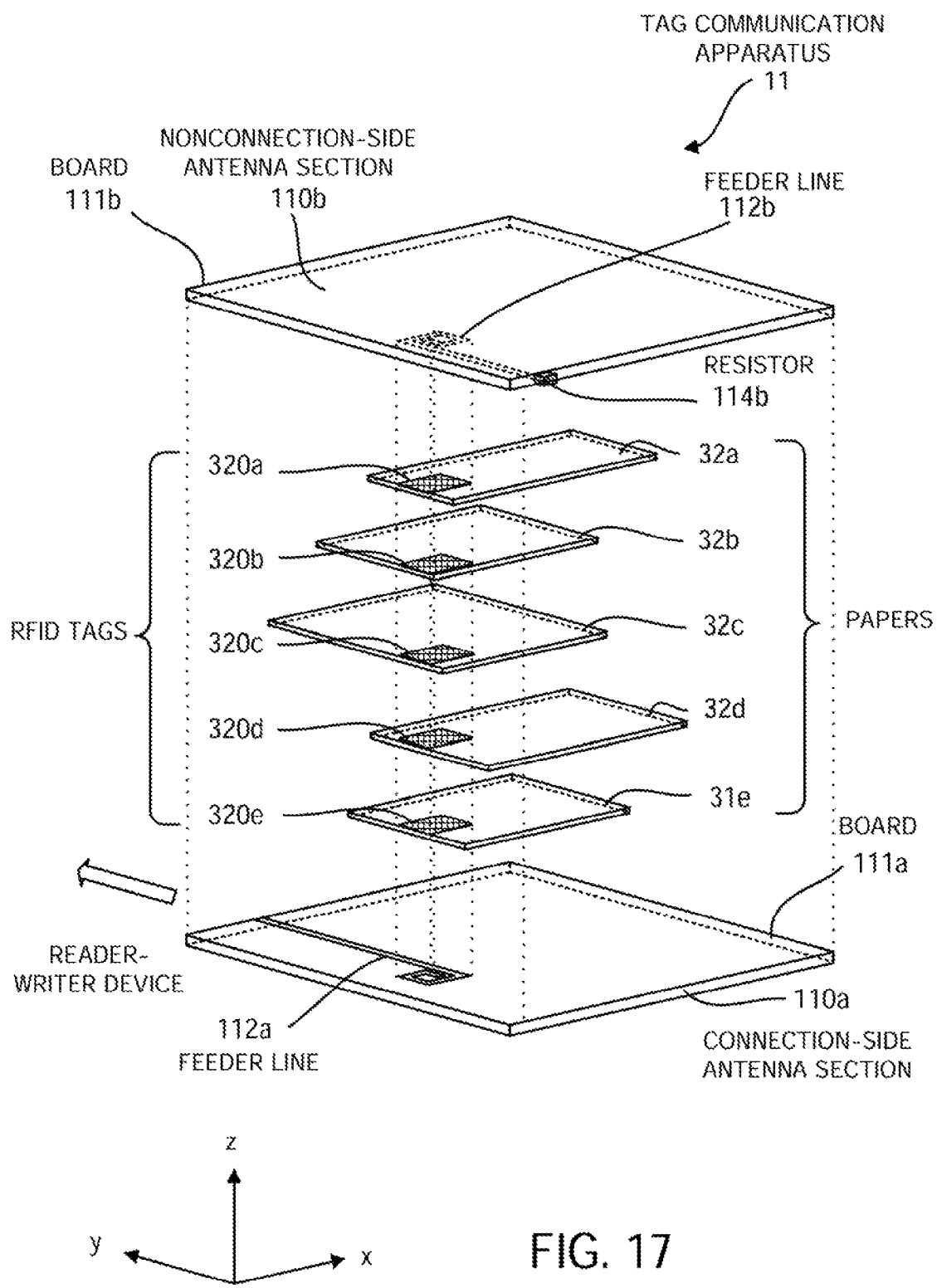
FIG. 17 illustrates the tag communication apparatus according to the third embodiment and objects of management.

FIGS. 16 and 17 illustrate a tag communication apparatus according to the third embodiment and objects of management. A tag communication apparatus 11 illustrated in FIG. 16 includes a connection-side antenna section 110*a* and a nonconnection-side antenna section 110*b*. In addition, the tag communication apparatus 11 is connected to a reader-writer device 500, performs radio communication with RFID tags 310*a* through 310*e* attached to papers 31*a* through 31*e*, respectively, which are objects of management, and outputs electromagnetic waves for supplying driving electric power to the RFID tags 310*a* through 310*e*. This is the same with the antenna 100 according to the second embodiment.

The antenna 100 according to the second embodiment is used on the premise that the RFID tags 300*a* through 300*e* are close to the feeder lines 102*a* and 102*b* and that the RFID tags 300*a* through 300*e* are close to one another. Accordingly, if one of the RFID tags 300*a* through 300*e* becomes far distant from the rest, then communication with the RFID tag may be impossible. With the tag communication apparatus 11 according to this embodiment, the RFID tags with which the reader-writer device 500 communicates can be aligned with the feeder lines.

In this embodiment, the papers 31*a* through 31*e* are articles to be managed, and the RFID tags 310*a* through 310*e* are attached to the papers 31*a* through 31*e* respectively. In addition, the papers 31*a* through 31*e* are prepared so that the positions of the RFID tags 310*a* through 310*e* can be confirmed from the outside. For example, glaring colors are put at the positions of the RFID tags 310*a* through 310*e*.

The connection-side antenna section 110*a* includes a board 111*a*, a feeder line 112*a*, and GND (not illustrated) and is connected to the reader-writer device 500. This is the same with the connection-side antenna section 100*a* of the antenna 100 according to the second embodiment.

The board 111*a* is a dielectric of FR4 or the like. This is the same with the board 101*a* of the connection-side antenna section 100*a* of the antenna 100 according to the second embodiment. The feeder line 112*a* is formed on a surface of the board 111*a* opposite to the RFID tags 310*a* through 310*e*. One end of the feeder line 112*a* is a feeding point and the other end of the feeder line 112*a* is an open end. This is the same with the feeder line 102*a* of the antenna 100 according to the second embodiment. The GND is formed on a surface of the board 111*a* opposite to the surface on which the feeder line 112*a* is formed.

The nonconnection-side antenna section 110*b* includes a board 111*b*, a feeder line 112*b*, a resistor 114*b*, and GND (not illustrated). This is the same with the nonconnection-side antenna section 100*b* of the antenna 100 according to the second embodiment. The nonconnection-side antenna section 110b is placed opposite the connection-side antenna section 110a.

The board 111b is a dielectric of FR4 or the like. This is the same with the board 111a of the connection-side antenna section 110a. The feeder line 112b is formed on a surface of the board 111b opposite to the RFID tags 310a through 310e. The resistor 114b for termination is connected to one end of the feeder line 112b and the other end of the feeder line 112b is an open end. This is the same with the feeder line 102b of the antenna 100 according to the second embodiment. The GND is formed on a surface of the board 111b opposite to the surface on which the feeder line 112b is formed. This is the same with the board 111a of the connection-side antenna section 110a.

When a user of the tag communication apparatus 11 reads out information from and writes information to the RFID tags 310a through 310e by the use of the tag communication apparatus 11, the user adjusts the positions of the RFID tags 310a through 310e attached to the papers 31a through 31e, respectively, so that the RFID tags 310a through 310e will be superimposed on the feeder line 112a on the x-y plane of FIG. 16. The user then places the papers 31a through 31e on the connection-side antenna section 110a connected to the reader-writer device 500. The user then places the nonconnection-side antenna section 110b from above with the papers 31a through 31e therebetween so that the feeder line 112b will be superimposed on the feeder line 112a and the RFID tags 310a through 310e. By doing so, electric power is supplied to each RFID tag. Therefore, the reader-writer device 500 can communicate with the RFID tags 310a through 310e.

As illustrated in FIG. 17, even if objects of management are not equal in shape or size or RFID tags 320a through 320e attached are not lined up, a user of the tag communication apparatus 11 visually confirms the RFID tags 320a through 320e, aligns each RFID tag 320 with the other RFID tags 320 and the feeder lines 112a and 112b, places papers 32a through 32e on the connection-side antenna section 110a, and places the nonconnection-side antenna section 110b from above. By doing so, the reader-writer device 500 connected to the connection-side antenna section 110a can communicate with the RFID tags 320a through 320e.

In this embodiment, the connection-side antenna section 110a is placed on the lower side (on the negative side of the z-axis of FIG. 16 or 17). The nonconnection-side antenna section 110b is placed on the upper side (on the positive side of the z-axis of FIG. 16 or 17) so that it will be opposite to the connection-side antenna section 110a. However, the nonconnection-side antenna section 110b may be placed on the lower side and the connection-side antenna section 110a may be placed on the upper side. Furthermore, the connection-side antenna section 110a and the nonconnection-side antenna section 110b may be placed in any direction so that they will be opposite to each other.

Moreover, the RFID tags 310a through 310e or 320a through 320e are attached to the papers 31a through 31e or 32a through 32e so that they can visually be confirmed. However, a marker by which the position of a RFID tag can be perceived visually or tactually, together with the RFID tag, may be attached to an article to be managed. For example, a mark or irregularities indicative of the position of the RFID tag are used as the marker.

In this embodiment the case where information is read out from and written to the five RFID tags 310a through 310e has been described. However, the number of RFID tags is not limited to five. Information may be read out from and written to six RFID tags or more or four RFID tags or less.

Furthermore, the tag communication apparatus 11 performs communication for reading out information from and writing information to the RFID tags 310a through 310e. However, the tag communication apparatus 11 may perform communication only for reading out information from the RFID tags 310a through 310e or only for writing information to the RFID tags 310a through 310e.

According to the third embodiment, as has been described, the positions of the RFID tags 310a through 310e or 320a through 320e attached to the papers 31a through 31e or 32a through 32e which are articles to be managed can be confirmed visually. The third embodiment differs from the second embodiment in this respect. Therefore, it becomes easy to line up the RFID tags and to place them on the tag communication apparatus 11.

Furthermore, if RFID tags are attached to a large number of papers, such as concert tickets, to be managed which are equal in shape and size, then the RFID tags should be attached to the same position. By doing so, the RFID tags can be lined up easily.

Fourth Embodiment

A fourth embodiment will now be described. The differences between the above third embodiment and the fourth embodiment will chiefly be described. The same components are marked with the same symbols and descriptions of them will be omitted.

The fourth embodiment differs from the third embodiment in that RFID tags attached to articles to be managed can be lined up by guide side sections included in a tag communication apparatus and in that the tag communication apparatus is suitable for articles to be managed to a corner of each of which a RFID tag is attached.

Figure 18:
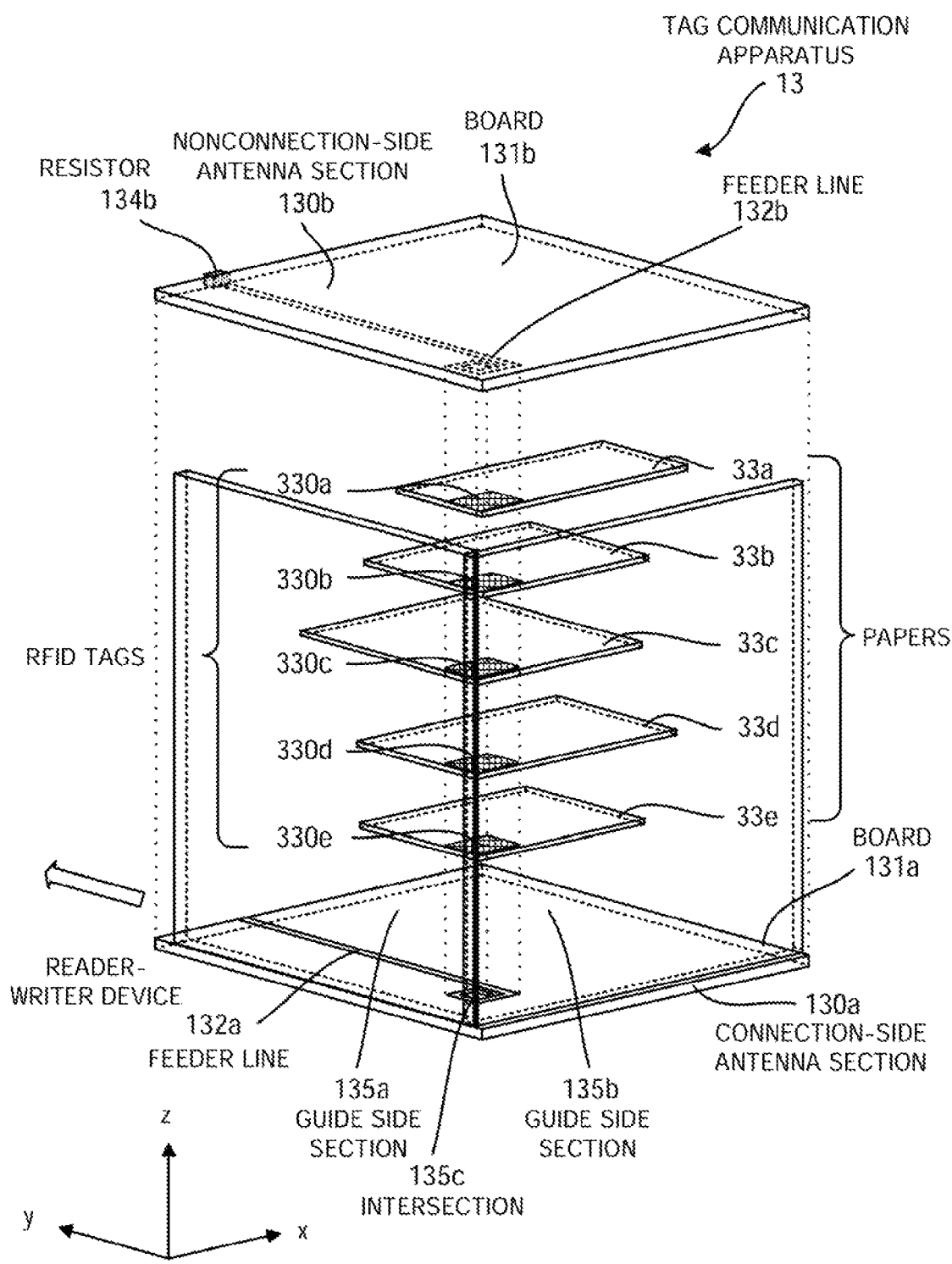
FIG. 18 illustrates a tag communication apparatus according to a fourth embodiment and objects of management.

FIG. 18 illustrates the tag communication apparatus according to the fourth embodiment and objects of management. A tag communication apparatus 13 illustrated in FIG. 18 includes a connection-side antenna section 130a and a nonconnection-side antenna section 130b. In addition, the tag communication apparatus 13 is connected to a reader-writer device 500, performs radio communication with RFID tags 330a through 330e attached to papers 33a through 33e, respectively, which are objects of management, and outputs electromagnetic waves for supplying driving electric power to the RFID tags 330a through 330e. This is the same with the tag communication apparatus 11 according to the third embodiment.

In this embodiment the papers 33a through 33e are articles to be managed. The RFID tags 330a through 330e are attached to corners of the papers 33a through 33e, respectively, so that they can be confirmed visually from the outside.

The connection-side antenna section 130a includes a board 131a, a feeder line 132a, and GND (not illustrated) and is connected to the reader-writer device 500. This is the same with the connection-side antenna section 110a of the tag communication apparatus 11 according to the third embodiment.

The board 131a is a dielectric of FR4 or the like. This is the same with the board 111a of the connection-side antenna section 110a of the tag communication apparatus 11 according to the third embodiment. The feeder line 132a is formed on a surface of the board 131a opposite to the RFID tags 330a through 330e so that its spiral portion will be near one end of an intersection of guide side sections 135a and 135b. One end of the feeder line 132a is a feeding point and the other end of the feeder line 132a is an open end. This is the same with the feeder line 112a of the tag communication apparatus 11 according to the third embodiment. The GND is formed on a surface of the board 131a opposite to the surface on which the feeder line 132a is formed.

The nonconnection-side antenna section 130b includes a board 131b, a feeder line 132b, a resistor 134b, and GND (not illustrated). This is the same with the nonconnection-side antenna section 110b of the tag communication apparatus 11 according to the third embodiment. The nonconnection-side antenna section 130b is placed opposite the connection-side antenna section 130a.

The board 131b is a dielectric of FR4 or the like. This is the same with the board 131a of the connection-side antenna section 130a. The feeder line 132b is formed on a surface of the board 131b opposite to the RFID tags 330a through 330e so that its spiral portion will be near a corner of the board 131b. The resistor 134b for termination is connected to one end of the feeder line 132b and the other end of the feeder line 132b is an open end. This is the same with the feeder line 112b of the tag communication apparatus 11 according to the third embodiment. The GND is formed on a surface of the board 131b opposite to the surface on which the feeder line 132b is formed. This is the same with the board 131a of the connection-side antenna section 130a.

In addition, the tag communication apparatus 13 includes the guide side sections 135a and 135b which are perpendicular to the connection-side antenna section 130a and which are perpendicular to each other. The guide side sections 135a and 135b are used for guiding the papers 33a through 33e to which the RFID tags 330a through 330e are respectively attached at the time of placing them on the connection-side antenna section 130a. The guide side section 135a is fixed to the connection-side antenna section 130a and is parallel to the y-z plane of FIG. 18. The guide side section 135b is fixed to the connection-side antenna section 130a and is parallel to the z-x plane of FIG. 18. An intersection 135c of the guide side sections 135a and 135b is parallel to the z-axis of FIG. 18. Each of the guide side sections 135a and 135b function as a side section.

When a user of the tag communication apparatus 13 reads out information from and writes information to the RFID tags 330a through 330e by the use of the tag communication apparatus 13; the user places the papers 33e on the connection-side antenna section 130a so that the RFID tag 330e attached to the papers 33e will be touching the guide side sections 135a and 135b, that is to say, so that the RFID tag 330e will be touching the intersection 135c. The user then places the papers 33d on the papers 33e so that the RFID tag 330d attached to the papers 33d will be touching the intersection 135c. The user then places the papers 33c, 33b, and 33a in that order in the same way and places the nonconnection-side antenna section 130b from above with the papers 33a through 33e therebetween. At this time the user places the nonconnection-side antenna section 130b so that the corner near which the feeder line 132b is formed will be touching the intersection 135c of the guide side sections 135a and 135b. The feeder lines 132a and 132b and the RFID tags 330a through 330e are lined up in this way. As a result, sufficient electric power can be supplied to each RFID tag and the reader-writer device 500 can communicate with the RFID tags 330a through 330e.

In this embodiment the case where information is read out from and written to the five RFID tags 330a through 330e has been described. However, the number of RFID tags is not limited to five. Information may be read out from and written to six RFID tags or more or four RFID tags or less.

Furthermore, the tag communication apparatus 13 performs communication for reading out information from and writing information to the RFID tags 330a through 330e. However, the tag communication apparatus 13 may perform communication only for reading out information from the RFID tags 330a through 330e or only for writing information to the RFID tags 330a through 330e.

According to the fourth embodiment, as has been described, articles to be managed are placed so that they will be touching the guide side sections 135a and 135b. The fourth embodiment differs from the third embodiment in this respect. As a result, it becomes easy for a user to line up RFID tags and to place them on the tag communication apparatus 13.

For example, if papers, such as important bonds or home-delivered papers, which are objects of management and which differ in size or shape mingle, then RFID tags should be attached to their corners. By doing so, communication can be performed with the RFID tags which are lined up by lining up the corners of the papers.

Fifth Embodiment

A fifth embodiment will now be described. The differences between the above third embodiment and the fifth embodiment will chiefly be described. The same components are marked with the same symbols and descriptions of them will be omitted.

The fifth embodiment differs from the third embodiment in that alignment can be performed by forming a guide indicator indicative of the positions of RFID tags on a side section which extends upward from a connection-side antenna section of a tag communication apparatus and in that the tag communication apparatus is suitable for articles to be managed to a side of each of which a RFID tag is attached.

Figure 19:
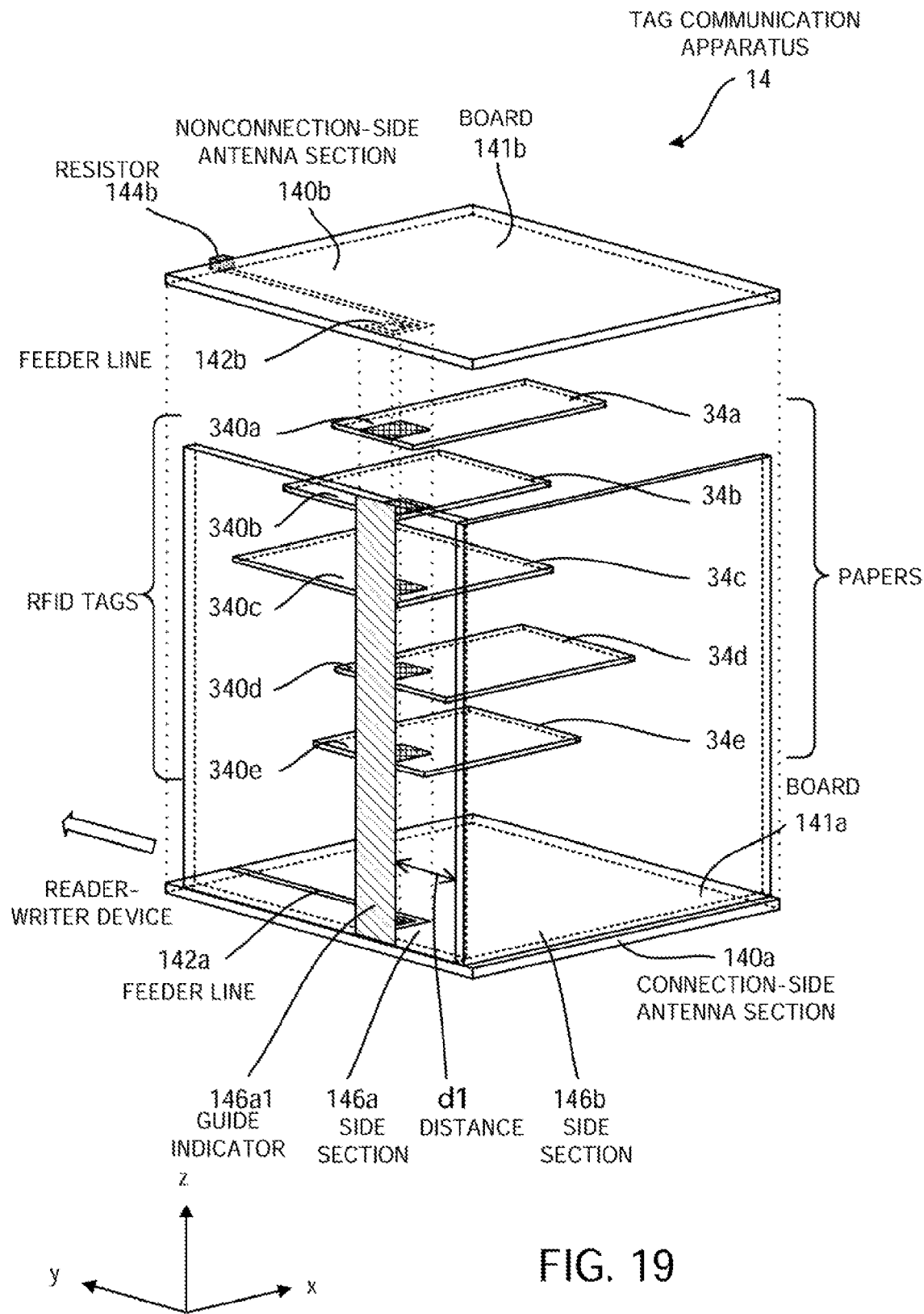
FIG. 19 illustrates a tag communication apparatus according to a fifth embodiment and objects of management.

FIG. 19 illustrates the tag communication apparatus according to the fifth embodiment and objects of management. A tag communication apparatus 14 illustrated in FIG. 19 includes a connection-side antenna section 140a and a nonconnection-side antenna section 140b. In addition, the tag communication apparatus 14 is connected to a reader-writer device 500, performs radio communication with RFID tags 340a through 340e attached to papers 34a through 34e, respectively, which are objects of management, and outputs electromagnetic waves for supplying driving electric power to the RFID tags 340a through 340e. This is the same with the tag communication apparatus 13 according to the fourth embodiment.

In this embodiment the papers 34a through 34e are articles to be managed. The RFID tags 340a through 340e are attached near sides of the papers 34a through 34e, respectively, so that their positions can be confirmed from the outside.

The connection-side antenna section 140a includes a board 141a, a feeder line 142a, and GND (not illustrated) and is connected to the reader-writer device 500. This is the same with the connection-side antenna section 110a of the tag communication apparatus 11 according to the third embodiment.

The board 141a is a dielectric of FR4 or the like. This is the same with the board 111a of the connection-side antenna section 110a of the tag communication apparatus 11 according to the third embodiment. The feeder line 142a is formed on a surface of the board 141a opposite to the RFID tags 340.a through 340e so that its spiral portion will be near a side section 146a and so that its spiral portion will be at a distance of d1 from an intersection of the side section 146a and a side section 146b. One end of the feeder line 142a is a feeding point and the other end of the feeder line 142a is an open end.

This is the same with the feeder line 112a of the tag communication apparatus 11 according to the third embodiment. The distance d1 can be set properly on the basis of the size or the like of the papers 34a through 34e. The GND is formed on a surface of the board 141a opposite to the surface on which the feeder line 142a is formed.

The nonconnection-side antenna section 140b includes a board 141b, a feeder line 142b, a resistor 144b, and GND (not illustrated). This is the same with the nonconnection-side antenna section 110b of the tag communication apparatus 11 according to the third embodiment. The nonconnection-side antenna section 140b is placed opposite the connection-side antenna section 140a.

The board 141b is a dielectric of FR4 or the like. This is the same with the board 141a of the connection-side antenna section 140a. The feeder line 142b is formed on a surface of the board 141b opposite to the RFID tags 340a through 340e so that its spiral portion will be near one side of the board 141b and so that its spiral portion will be at a distance of d1 from another side of the board 141b. By doing so, the position of its spiral portion matches a position indicated by a guide indicator 146a1 when the board 141b is placed on the RFID tags 340a through 340e. The resistor 144b for termination is connected to one end of the feeder line 142b and the other end of the feeder line 142b is an open end. This is the same with the feeder line 112b of the tag communication apparatus 11 according to the third embodiment. The GND is formed on a surface of the board 141b opposite to the surface on which the feeder line 142b is formed. This is the same with the board 141a of the connection-side antenna section 140a.

In addition, the tag communication apparatus 14 includes the side sections 146a and 146b which are perpendicular to the connection-side antenna section 140a and which are perpendicular to each other.

The side section 146a is fixed to the connection-side antenna section 140a and is parallel to the y-z plane of FIG. 19. The side section 146b is fixed to the connection-side antenna section 140a and is parallel to the z-x plane of FIG. 19.

The guide indicator 146a1 is formed on the side section 146a. When the papers 34a through 34e are placed on the connection-side antenna section 140a, the guide indicator 146a1 is used for lining up the RFID tags 340a through 340e. The guide indicator 146a1 indicates positions where the RFID tags 340a through 340e is to be placed at the time of placing the papers 34a through 34e so as to be touching the side section 146a. The guide indicator 146a1 is a colored belt or belt-like irregularities with determined width (which is equal to the width of the RFID tags 340a through 340e, for example) which are formed on the side section 146a at a distance of d1 from the intersection of the side sections 146a and 146b and which extends in parallel with the z-axis of FIG. 19 from, for example, a position adjacent to the connection-side antenna section 140a. The guide indicator 146a1 functions as a guide indication section.

When a user of the tag communication apparatus reads out information from and writes information to the RFID tags 340a through 340e by the use of the tag communication apparatus 14, the user places the papers 34e on the connection-side antenna section 140a so that the RFID tag 340e attached to the papers 34e will be touching the guide indicator 146a1 formed on the side section 146a. The user then places the papers 34d on the papers 34e so that the RFID tag 340d attached to the papers 34d will be touching the guide indicator 146a1. The user then places the papers 34c, 34b, and 34a in that order in the same way and places the nonconnection-side antenna section 140b from above with the papers 34a through 34e therebetween. As a result, sufficient electric power can be supplied to each RFID tag and the reader-writer device 500 can communicate with the RFID tags 340a through 340e.

In this embodiment the case where information is read out from and written to the five RFID tags 340a through 340e has been described. However, the number of RFID tags is not limited to five. Information may be read out from and written to six RFID tags or more or four RFID tags or less.

Furthermore, the tag communication apparatus 14 performs communication for reading out information from and writing information to the RFID tags 340a through 340e. However, the tag communication apparatus 14 may perform communication only for reading out information from the RFID tags 340a through 340e or only for writing information to the RFID tags 340a through 340e.

According to the fifth embodiment, as has been described, the papers 34a through 34e which are articles to be managed are placed so that they will be touching the guide indicator 146a1 formed on the side section 146a. The fifth embodiment differs from the third embodiment in this respect. As a result, it becomes easy for a user to line up RFID tags and to place them on the tag communication apparatus 14.

Sixth Embodiment

A sixth embodiment will now be described. The differences between the above third embodiment and the sixth embodiment will chiefly be described. The same components are marked with the same symbols and descriptions of them will be omitted.

The sixth embodiment differs from the third embodiment in that feeder lines and RFID tags are placed vertically (in parallel with the z-axis of FIG. 20), in that a tag communication apparatus includes a rear section and a bottom section for lining up the RFID tags, and in that the tag communication apparatus is suitable for articles to be managed to a determined position on a side of each of which a RFID tag is attached.

Figure 20:
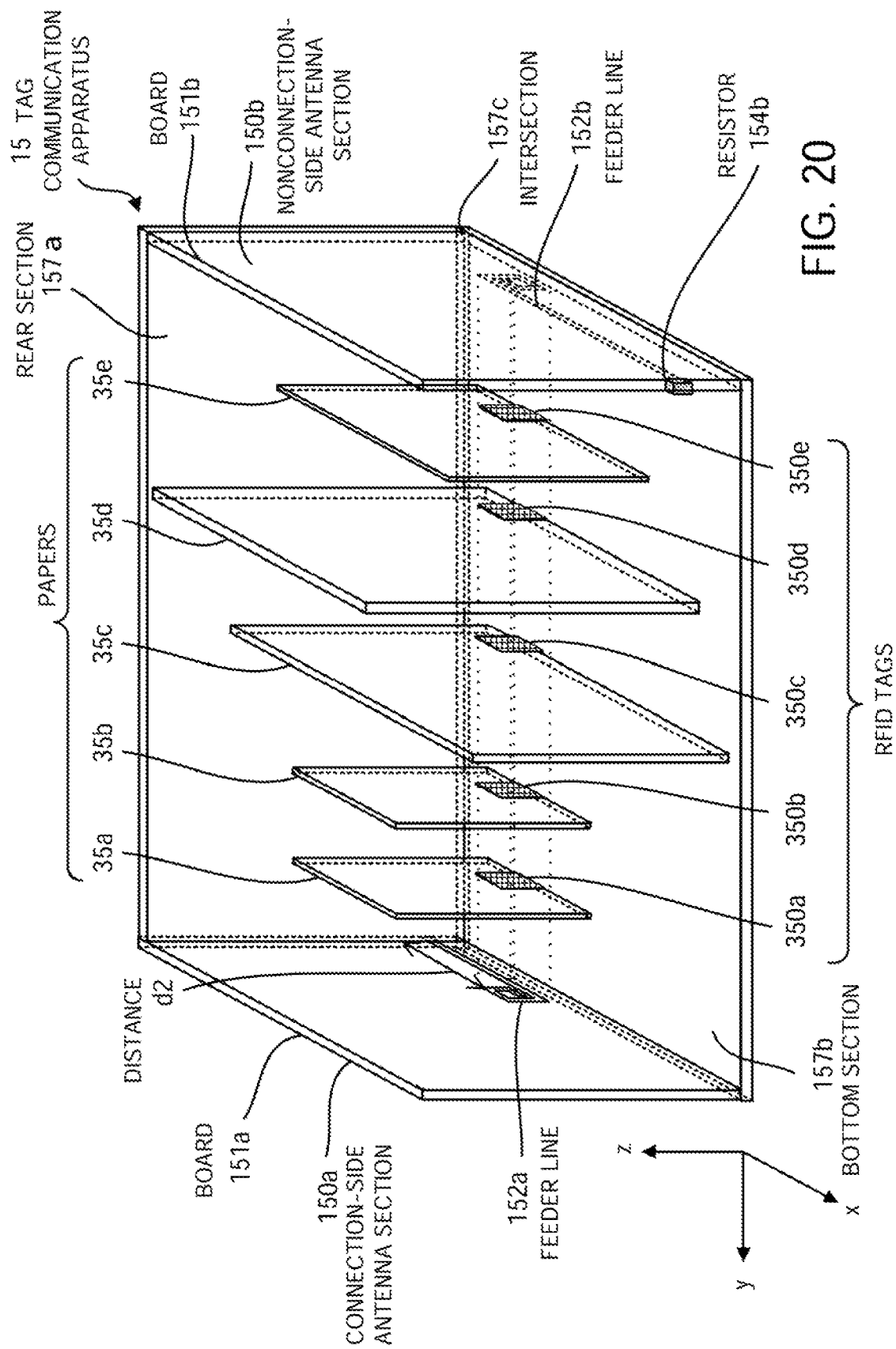
FIG. 20 illustrates a tag communication apparatus according to a sixth embodiment and objects of management.

FIG. 20 illustrates the tag communication apparatus according to the sixth embodiment and objects of management. A tag communication apparatus 15 illustrated in FIG. 20 includes a connection-side antenna section 150a and a nonconnection-side antenna section 150b. In addition, the tag communication apparatus 15 is connected to a reader-writer device 500, performs radio communication with RFID tags 350a through 350e attached to papers 35a through 35e, respectively, which are objects of management, and outputs electromagnetic waves for supplying driving electric power to the RFID tags 350a through 350e. This is the same with the tag communication apparatus 11 according to the third embodiment.

In this embodiment the papers 35a through 35e are articles to be managed. Each of the RFID tags 350a through 350e is attached to a position which is near a side of papers 35 and which is at a distance of d2 from another side of the papers 35, so that it can be confirmed visually from the outside. The distance d2 can be set properly on the basis of the size or the like of the papers 35.

The connection-side antenna section 150a includes a board 151a, a feeder line 152a, and GND (not illustrated) and is connected to the reader-writer device 500. This is the same with the connection-side antenna section 110a of the tag communication apparatus 11 according to the third embodiment.

The board 151a is a dielectric of FR4 or the like. This is the same with the board 111a of the connection-side antenna section 110a of the tag communication apparatus 11 according to the third embodiment. The feeder line 152a is formed on a surface of the board 151a opposite to the RFID tags 350a through 350e so that its spiral portion will be near a bottom section 157b and so that its spiral portion will be at a distance of d2 from an intersection 157c. One end of the feeder line 152a is a feeding point and the other end of the feeder line 152a is an open end. This is the same with the feeder line 112a of the tag communication apparatus 11 according to the third embodiment. The GND is formed on a surface of the board 151a opposite to the surface on which the feeder line 152a is formed.

The nonconnection-side antenna section 150b includes a board 151b, a feeder line 152b, a resistor 154b, and GND (not illustrated). This is the same with the nonconnection-side antenna section 110b of the tag communication apparatus 11 according to the third embodiment. The nonconnection-side antenna section 150b is placed opposite the connection-side antenna section 150a.

The board 151b is a dielectric of FR4 or the like. This is the same with the board 151a of the connection-side antenna section 150a. The feeder line 152b is formed on a surface of the board 151b opposite to the RFID tags 350a through 350e so that its spiral portion will be near one side of the board 151b and so that its spiral portion will be at a distance of d2 from another side of the board 151b. The resistor 154b for termination is connected to one end of the feeder line 152b and the other end of the feeder line 152b is an open end. This is the same with the feeder line 112b of the tag communication apparatus 11 according to the third embodiment. In addition, the board 151b is placed on the bottom section 157b so that one side of the board 151b will be touching the bottom section 157b and so that another side of the board 151b will be touching a rear section 157a. The GND is formed on a surface of the board 151b opposite to the surface on which the feeder line 152b is formed. This is the same with the board 151a of the connection-side antenna section 150a.

Furthermore, the tag communication apparatus 15 includes the rear section 157a and the bottom section 157b. The rear section 157a is a side section which is placed in parallel with the y-z plane of the FIG. 20 between the connection-side antenna section 150a and the nonconnection-side antenna section 150b. When the papers 35a through 35e to which the RFID tags 350a through 350e are respectively attached are placed on the tag communication apparatus 15, the rear section 157a guides the papers 35a through 35e by positioning them in the direction of the depth. When the papers 35a through 35e to which the RFID tags 350a through 350e are respectively attached are placed on the tag communication apparatus 15, the bottom section 157b guides the papers 35a through 35e by supporting them from under.

When a user of the tag communication apparatus 15 reads out information from and writes information to the RFID tags 350a through 350e by the use of the tag communication apparatus 15, the user places the papers 35a through 35e to which the RFID tags 350a through 350e are respectively attached end to end (in parallel with the board 151a of the connection-side antenna section 150a) on the connection-side antenna section 150a so that the papers 35a through 35e will be touching the intersection 157c of the rear section 157a and the bottom section 157b which is parallel to the y-axis of FIG. 20. The user then moves the nonconnection-side antenna section 150b in the direction of the positive of the y-axis of FIG. 20 and places it vertically so that the papers 35a through 35e will be between the connection-side antenna section 150a and the nonconnection-side antenna section 150b. At this time a space between the connection-side antenna section 150a and the nonconnection-side antenna section 150b should be adjusted properly (for example, so that it will become as narrow as possible). As a result, sufficient electric power can be supplied to each RFID tag and the reader-writer device 500 can communicate with the RFID tags 350a through 350e.

In this embodiment the position of the feeder line 152a is near the bottom section 157b. However, the position of the feeder line 152a may be at properly determined height above the bottom section 157b. In this case, the positions of the RFID tags 350a through 350e are at the determined height above the bottom section 157b. In addition, the position of the spiral portion of the feeder line 152a is at the determined height above the bottom section 157b.

Moreover, in this embodiment the case where information is read out from and written to the five RFID tags 350a through 350e has been described. However, the number of RFID tags is not limited to five. Information may be read out from and written to six RFID tags or more or four RFID tags or less.

Furthermore, the tag communication apparatus 15 performs communication for reading out information from and writing information to the RFID tags 350a through 350e. However, the tag communication apparatus 15 may perform communication only for reading out information from the RFID tags 350a through 350e or only for writing information to the RFID tags 350a through 350e.

According to the sixth embodiment, as has been described, the papers 35a through 35e which are articles to be managed are placed so that they will be touching the rear section 157a and the bottom section 157b. The sixth embodiment differs from the third embodiment in this respect. As a result, it becomes easy for a user to line up RFID tags and to place them on the tag communication apparatus 15.

Seventh Embodiment

A seventh embodiment will now be described. The differences between the above second embodiment and the seventh embodiment will chiefly be described. The same components are marked with the same symbols and descriptions of them will be omitted.

The seventh embodiment differs from the second embodiment in that feeder lines of a connection-side antenna section and a nonconnection-side antenna section have the shape of a straight line.

Figure 21:
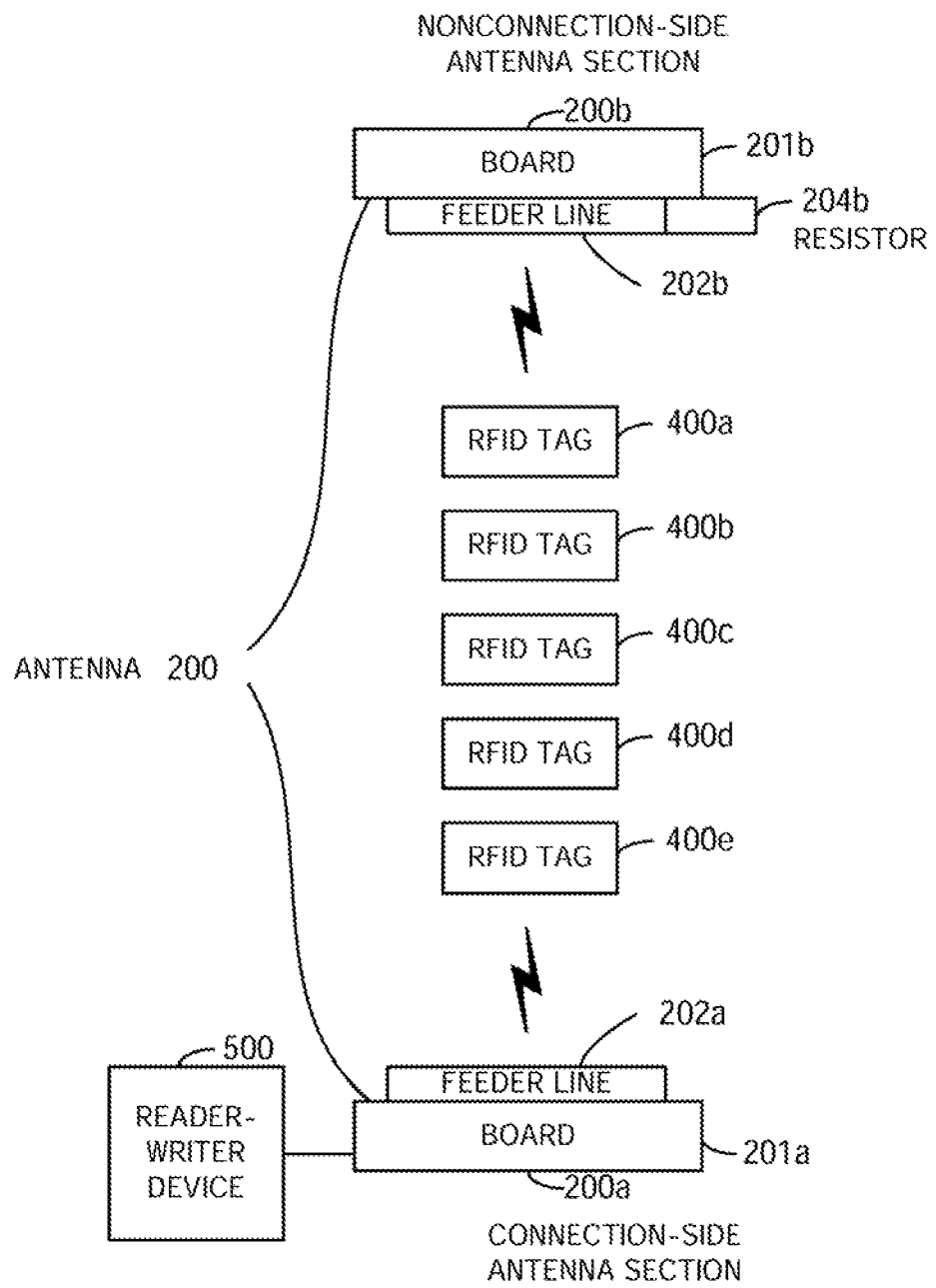
FIG. 21 is a block diagram of an antenna according to a seventh embodiment.

FIG. 21 is a block diagram of an antenna according to the seventh embodiment. An antenna 200 illustrated in FIG. 21 reads out and writes information by communicating with a plurality of RFID tags (RFID tags 400a through 400e, for example). In addition, the antenna 200 outputs electromagnetic waves in order to supply driving electric power to the RFID tags 400a through 400e. The antenna 200 is connected to a reader-writer device 500 via a matching circuit (not illustrated). The antenna 200 includes a connection-side antenna section 200a and a nonconnection-side antenna section 200b. The connection-side antenna section 200a includes a board 201a, a feeder line 202a, and GND. The nonconnection-side antenna section 200b includes a board 201b, a feeder line 202b, GND, and a resistor 204b.

One end of the feeder line 202a is a feeding point and the other end of the feeder line 202a is an open end. The feeder line 202a is connected to the reader-writer device 500 which communicates with each RFID tag, and outputs electromagnetic waves.

The board 201a is a dielectric and includes GND on a surface opposite to a surface on which the feeder line 202a is formed. The GND is connected to the feeder line 202a.

The feeder line 202a is a conductor pattern formed on the surface of the board 201a opposite to the RFID tags 400a through 400e. The feeder line 202a emits electromagnetic waves toward the RFID tags 400a through 400e on the basis of a signal from the reader-writer device 500. In addition, the feeder line 202a receives electromagnetic waves transmitted from the RFID tags 400a through 400e, and transmits a signal based on the received electromagnetic waves to the reader-writer device 500. The connection-side antenna section 200a supplies electric power to the RFID tags 400a through 400e by electromagnetic field coupling via the feeder line 202a and transmits electromagnetic waves to and receives electromagnetic waves from the RFID tags 400a through 400e.

One end of the feeder line 202b is a feeding point and the other end of the feeder line 202b is an open end. The feeder line 202b is opposite to the feeder line 202a of the connection-side antenna section 200a with the plurality of RFID tags therebetween. The feeder line 202b is a conductor pattern formed on a surface of the board 201b opposite to the RFID tags 400a through 400e. The board 201b is a dielectric and includes GND on a surface opposite to the surface on which the feeder line 202b is formed. The GND is connected to the feeder line 202b.

An antenna included in each of the RFID tags 400a through 400e according to this embodiment is an infinitesimal dipole antenna, so the feeder lines 202a and 202b have the shape of a straight line. In addition, each of the feeder lines 202a and 202b has an infinitesimal dipole structure the length of which is shorter than half of the wavelength λ of electromagnetic waves used for communicating with the RFID tags 400a through 400e.

In this embodiment the length of the feeder lines 202a and 202b each having an infinitesimal dipole structure should be made shorter than half of the wavelength λ of electromagnetic waves used for communicating with the RFID tags 400a through 400e. Usually the overall length of a dipole structure is set to half of the wavelength λ of electromagnetic waves used. However, if the length of a dipole structure is set to λ/2 in this embodiment, the radiation performance (gain) of each RFID tag itself may become excessively high. Therefore, in this embodiment the length of the feeder lines 202a and 202b each having a dipole structure is made shorter than λ/2 and is made with intent to deviate from the resonance condition for a dipole.

Each of the RFID tags 400a through 400e performs radio communication with the reader-writer device 500. By doing so, information is written and read out. Each of the RFID tags 400a through 400e is a passive RFID tag and is driven by the received power of electromagnetic waves transmitted from the antenna 200 connected to the reader-writer device 500. Each of the RFID tags 400a through 400e communicates with the reader-writer device 500 by the use of electromagnetic waves in the UHF band. An equivalent circuit of each of the RFID tags 400a through 400e meets a resonance condition.

The reader-writer device 500 performs radio communication with the RFID tags 400a through 400e via the antenna 200 and writes information to and reads out information from the RFID tags 400a through 400e. For example, the RFID tags 400a through 400e are attached to articles to be managed. Information regarding the articles to be managed is written to the RFID tags 400a through 400e. Accordingly, the objects of management can be managed by reading out the information written to the RFID tags 400a through 400e.

In this embodiment the articles to be managed may be papers kept in a library or the like, various kinds of tickets including admission tickets, products managed as stock, parts and fittings necessary for manufacturing products, or the like. However, the articles to be managed are not limited to them. If objects can be managed by associating them with information, then they are the articles to be managed.

In this embodiment the case where information is read out from and written to the five RFID tags 400a through 400e will be described. However, the number of RFID tags is not limited to five. Information may be read out from and written to six RFID tags or more or four RFID tags or less.

Furthermore, the antenna 200 performs communication for reading out information from and writing information to the RFID tags 400a through 400e. However, the antenna 200 may perform communication only for reading out information from the RFID tags 400a through 400e or only for writing information to the RFID tags 400a through 400e.

Figure 22:
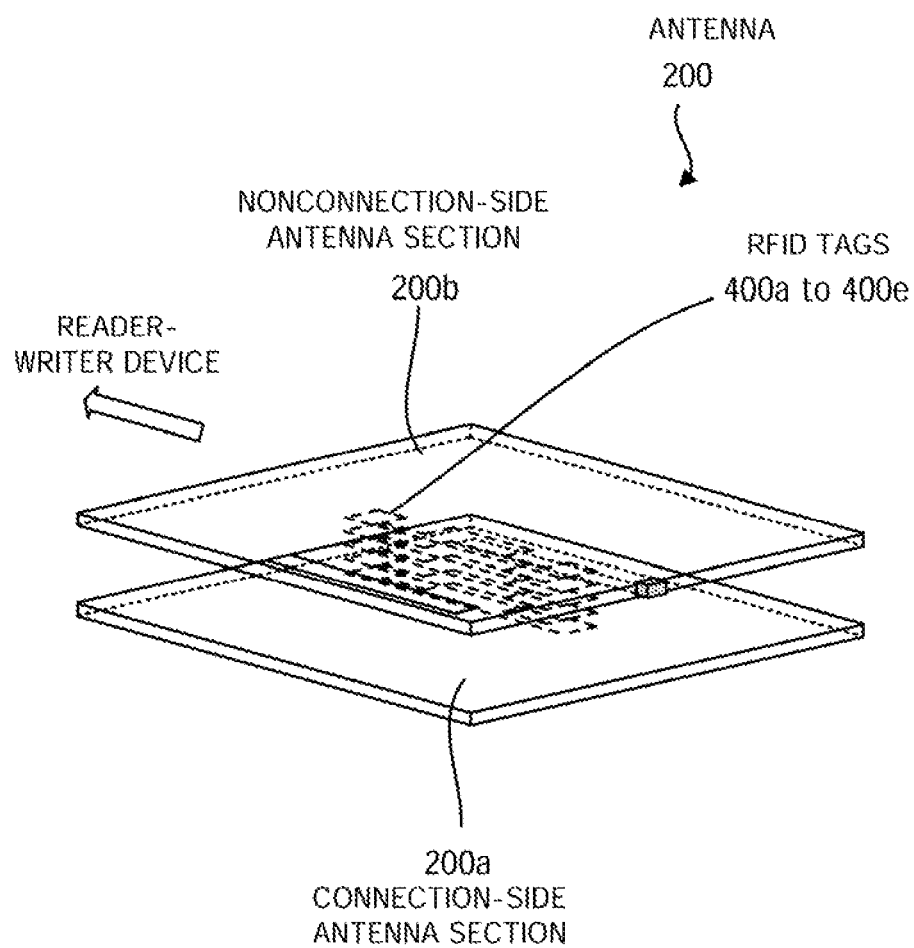
FIG. 22 illustrates the antenna and RFID tags according to the seventh embodiment.

FIG. 22 illustrates the antenna and the RFID tags according to the seventh embodiment. In this embodiment, as illustrated in FIG. 22, communication is performed with the RFID tags 400a through 400e placed between the connection-side antenna section 200a connected to the above reader-writer device 500 and the nonconnection-side antenna section 200b not connected to the reader-writer device 500. This is the same with the antenna 100 according to the second embodiment.

Figure 23:
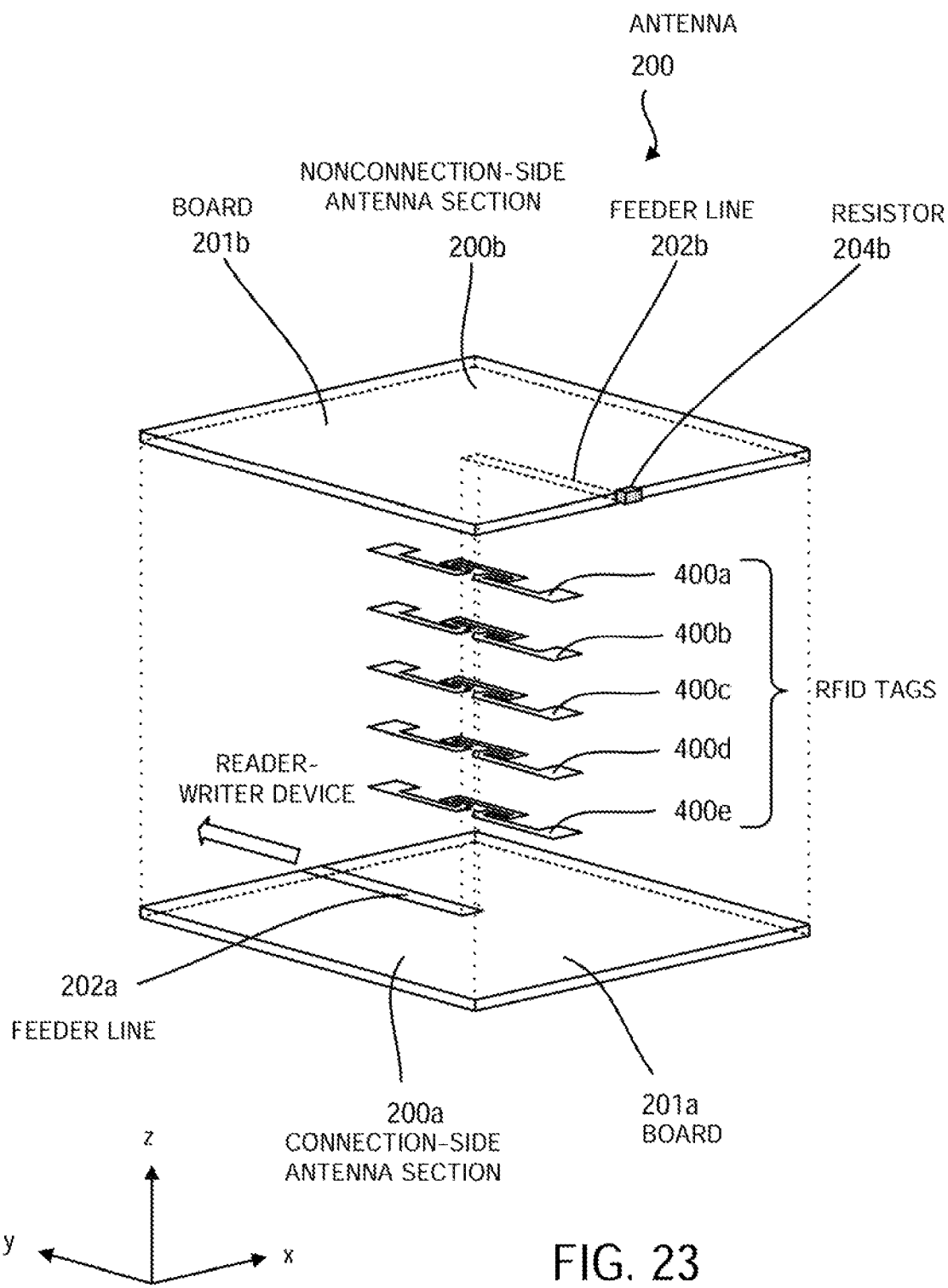
FIG. 23 is an exploded view of the antenna and the RFID tags according to the seventh embodiment.

FIG. 23 is an exploded view of the antenna and the RFID tags according to the seventh embodiment. In this embodiment, as illustrated in FIG. 23, the antenna 200 performs radio communication at communication time in a state in which the RFID tags 400a through 400e are placed in parallel with the x-y plane of the FIG. 23 between the connection-side antenna section 200a and the nonconnection-side antenna section 200b at the same position on the x-y plane of the FIG. 23. In addition, at communication time the antenna 200 outputs electromagnetic waves in order to supply driving electric power to the RFID tags 400a through 400e.

The connection-side antenna section 200a of the antenna 200 according to this embodiment includes the board 201a, the feeder line 202a, and the GND (not illustrated). This is the same with the connection-side antenna section 100a of the antenna 100 according to the second embodiment.

The board 201a is a dielectric of FR4 or the like. This is the same with the board 101a of the antenna 100 according to the second embodiment. The feeder line 202a is formed on the surface of the board 201a opposite to the RFID tags. One end of the feeder line 202a is a feeding point (not illustrated) and the other end of the feeder line 202a is an open end (not illustrated). The GND is formed on the surface of the board 201a opposite to the surface on which the feeder line 202a is formed.

The connection-side antenna section 200a is connected via the feeding point to the reader-writer device 500 which can communicate with the RFID tags. The RFID tags 400a through 400e with which the reader-writer device 500 communicates are then placed between the connection-side antenna section 200a and the nonconnection-side antenna section 200b of the antenna 200.

The nonconnection-side antenna section 200b of the antenna 200 according to this embodiment includes the board 201b, the feeder line 202b, the GND (not illustrated), and the resistor 204b. This is the same with the nonconnection-side antenna section 100b of the antenna 100 according to the second embodiment. This is the same with the nonconnection-side antenna section 100b of the antenna 100 according to the second embodiment.

The board 201b is a dielectric of FR4 or the like. This is the same with the board 101a of the connection-side antenna section 100a. This is the same with the board 201a of the connection-side antenna section 200a. The feeder line 202b is formed on the surface of the board 201b opposite to the RFID tags. The resistor 204b for termination is connected to one end of the feeder line 202b and the other end of the feeder line 102b is an open end. The GND is formed on the surface of the board 201b opposite to the surface on which the feeder line 202b is formed. This is the same with the board 201a of the connection-side antenna section 200a. The resistor 204b is, for example, a 50-ohm resistor and terminates the feeder line 202b. This is the same with the resistor 104b of the nonconnection-side antenna section 100b of the antenna 100 according to the second embodiment.

An antenna included in each of the RFID tags 400a through 400e according to this embodiment is an infinitesimal dipole antenna which is 47×15 mm in size. An antenna included in each of the RFID tags 400a through 400e has an infinitesimal dipole structure, so with the antenna 200 according to this embodiment the feeder lines 202a and 202b have the shape of a straight line corresponding to the infinitesimal dipole structure.

In addition, it is assumed that with each of the RFID tags 400a through 400e a capacitor Cc of a chip and an inductor La connected to an infinitesimal dipole meet the resonance condition given by the above equation (1).

It is desirable that the tips of the feeder lines 202a and 202b each having the shape of a straight line should be placed near the center of each of the RFID tags 400a through 400e. As a result, the feeding point (not illustrated) exists at the center of each of the RFID tags 400a through 400e. The highest voltage is generated at the tips of the feeder lines 202a and 202b. Accordingly, more electric power can be supplied to the RFID tags 400a through 400e.

The reader-writer device 500 transmits radio waves to and receives radio waves from the RFID tags 400a through 400e placed between the connection-side antenna section 200a and the nonconnection-side antenna section 200b via the antenna 200. By doing so, data is read out from and written to a semiconductor memory in a chip included in each of the RFID tags 400a through 400e.

In this embodiment, the connection-side antenna section 200a is placed on the lower side (on the negative side of the z-axis of FIG. 23). The nonconnection-side antenna section 200b is placed on the upper side (on the positive side of the z-axis of FIG. 23) so that it will be opposite to the connection-side antenna section 200a. However, the nonconnection-side antenna section 200b may be placed on the lower side, and the connection-side antenna section 200a may be placed on the upper side. Furthermore, the connection-side antenna section 200a and the nonconnection-side antenna section 200b may be placed in any direction so that they will be opposite to each other.

Figure 24:
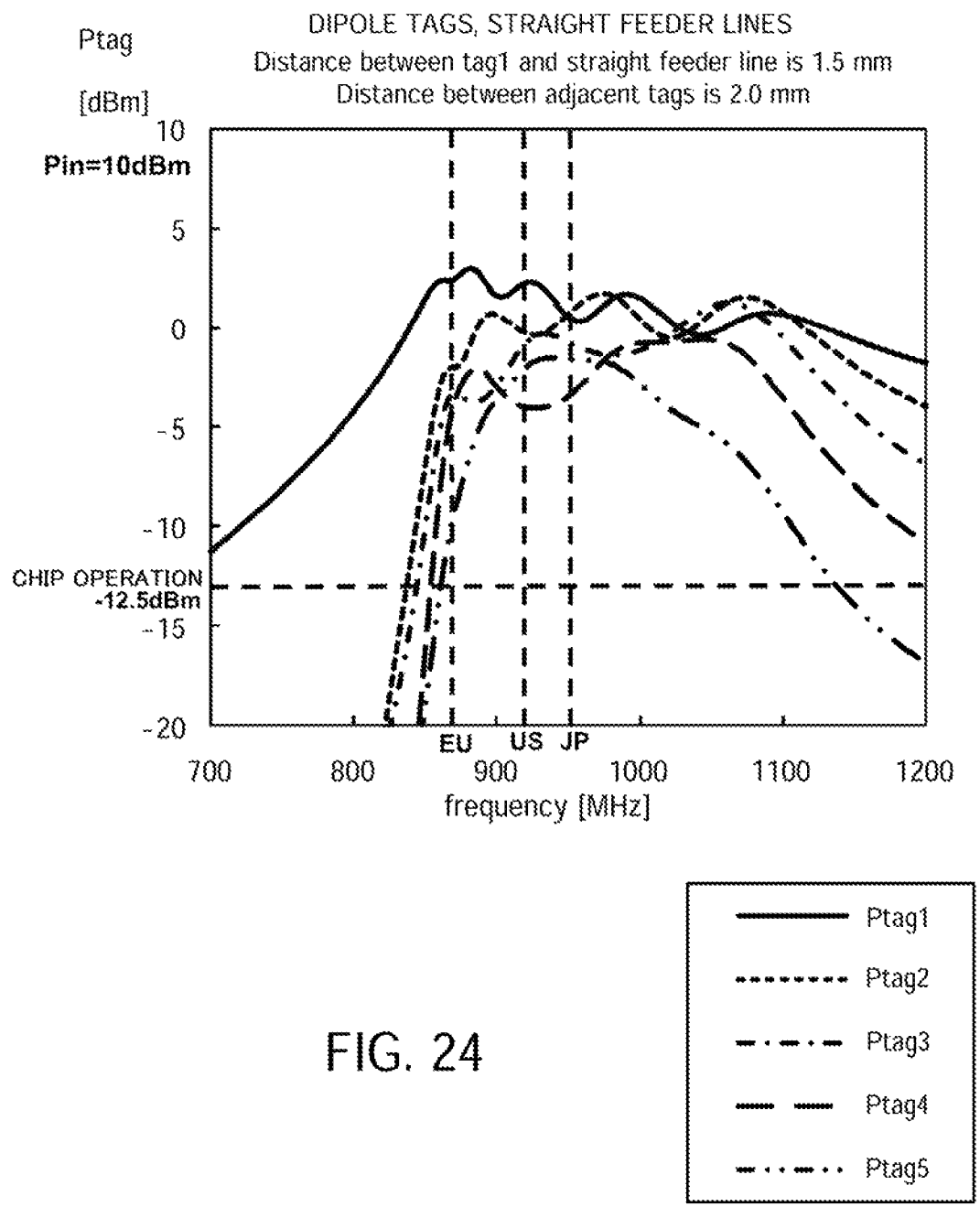
FIG. 24 illustrates the relationship between the operating frequency and gain of each RFID tag according to the seventh embodiment.
Figure 25:
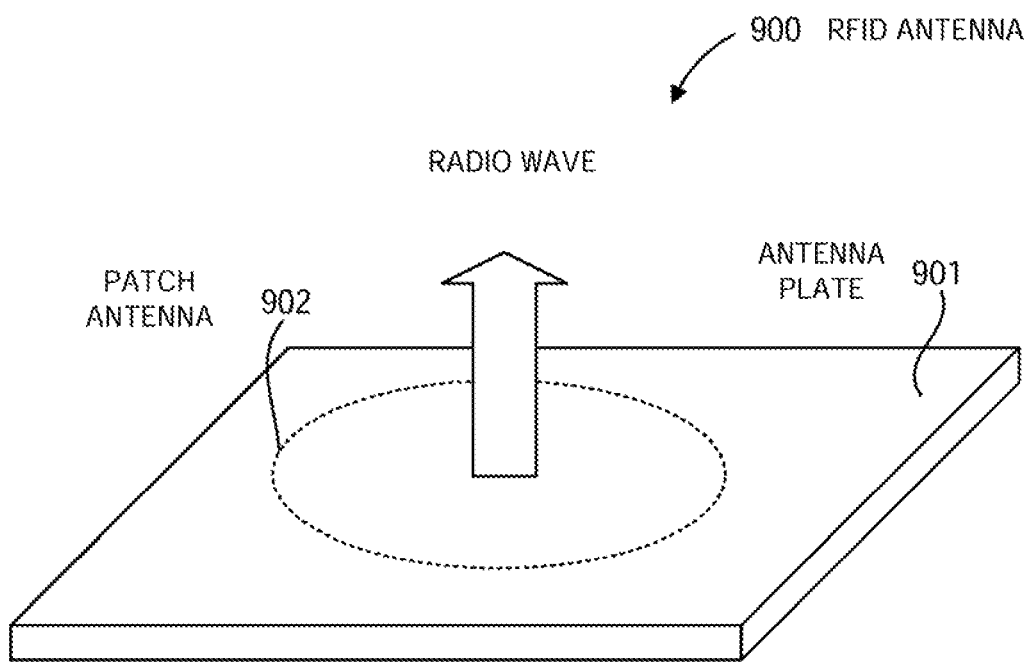
FIG. 25 illustrates the structure of a RFID antenna.

FIG. 24 illustrates the relationship between the operating frequency and gain of each RFID tag according to the seventh embodiment. FIG. 24 indicates results obtained by calculating supply electric power Ptag1 through Ptag5 supplied to the RFID tags 400a through 400e, respectively, at the time of inputting input electric power Pin=10 dBm to the antenna 200 using the feeder lines according to this embodiment by the use of the electromagnetic field simulator HFSS. In this embodiment the five RFID tags 400a through 400e are used. Electric power supplied to these RFID tags is calculated. However, the number of RFID tags is not limited to five. Any number of RFID tags may be used.

FIG. 24 indicates calculation results obtained in the case where the distance between the connection-side antenna section 200a and the RFID tag 400e is set to 1.5 mm, where the distance between the nonconnection-side antenna section 200b and the RFID tag 400a is set to 1.5 mm, and where the distance between adjacent RFID tags is set to 2 mm. As can be seen from FIG. 24, Ptag1 through Ptag5 are −10 to 4 dBm in the range of the EU frequency to the JP frequency and a margin is left for each of Ptag1 through Ptag5 with respect to the minimum operating power. Compared with the second embodiment, a band is slightly narrow. However, if one of the RFID tags 400a through 400e each including an infinitesimal dipole according to this embodiment performs communication singly in an ordinary RFID system using a patch antenna, it is easy for it to perform communication. The reason for this is that compared with a RFID tag in which an antenna has an infinitesimal loop structure, antenna gain is high. This is an advantage. Accordingly, the RFID tags 400a through 400e are suitable for the following use. Usually each of the RFID tags 400a through 400e performs communication singly by the use of another apparatus. If it is necessary to read out information from two or more RFID tags at the same time, then the antenna 200 is used for performing communication.

In the case of FIG. 24, calculations are performed on the assumption that papers, optical disks, or the like are selected as articles to be managed, that each RFID tag is surrounded by a dielectric (such as paper or plastic) having a relative permittivity $\in r$ of 3, and that the length of the infinitesimal dipole is 47 mm. $\lambda/2$ is about 140 mm in air and about 80 mm in a dielectric having a relative permittivity $\in r$ of 3.

According to the seventh embodiment, as has been described, the feeder lines 202a and 202b have the shape of a straight line, so the RFID tags 400a through 400e each including an infinitesimal dipole antenna suitable for single communication are proper.

According to the disclosed antenna, tag communication apparatus, and reader-writer system, communication can be performed with a plurality of tags which are close to one another by supplying electric power for operation to them.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that various changes, substitutions, and alterations could be made hereto without departing from the spirit and scope of the invention.

What is claimed is:

1. An antenna comprising:
    a first antenna section which has a first conductor, supplies electric power to a plurality of tags, and transmits electromagnetic waves to and receives electromagnetic waves from the plurality of tags, one end of the first conductor being a feeding point, an other end of the first conductor being an open end, the first conductor being connected to a reader-writer device for communicating with the plurality of tags, and the first conductor being able to output electromagnetic waves; and
    a second antenna section having a second conductor one end of which is connected to a resistor for termination, an other end of which is an open end, which is opposite to the first conductor of the first antenna section with the plurality of tags therebetween, and which is not connected directly to the reader-writer device.

2. The antenna according to claim 1, wherein:
    the first antenna section includes a first board which is a dielectric;

the second antenna section includes a second board which is a dielectric;

the first conductor is a conductor pattern formed on the first board; and the second conductor is a conductor pattern formed on the second board.

3. The antenna according to claim 1, wherein the second conductor is connected to a resistor for termination.

4. The antenna according to claim 1, wherein each of the first conductor and the second conductor has a shape corresponding to a shape of an antenna included in each of the plurality of tags.

5. The antenna according to claim 4, wherein each of the first conductor and the second conductor has a spiral shape.

6. The antenna according to claim 5, wherein the length of one circle of the first conductor and the second conductor each having a spiral shape is shorter than or equal to a wavelength of electromagnetic waves used for communicating with the plurality of tags.

7. The antenna according to claim 4, wherein each of the first conductor and the second conductor has the shape of a straight line.

8. The antenna according to claim 7, wherein length of the first conductor and the second conductor each having the shape of a straight line is shorter than or equal to half of a wavelength of electromagnetic waves used for communicating with the plurality of tags.

9. The antenna according to claim 2, wherein:

the first conductor is formed on a surface of the first board opposite to the plurality of tags and the first board includes GND connected to the first conductor on a surface opposite to the surface on which the first conductor is formed; and the second conductor is formed on a surface of the second board opposite to the plurality of tags and the second board includes GND connected to the second conductor on a surface opposite to the surface on which the second conductor is formed.

10. The antenna according to claim 1, wherein an equivalent circuit of each of the plurality of tags meets a resonance condition.

11. A tag communication apparatus comprising:

an antenna including:

a first antenna section which includes a first conductor, supplies electric power to a plurality of tags, and transmits electromagnetic waves to and receives electromagnetic waves from the plurality of tags, one end of the first conductor being a feeding point, an other end of the first conductor being an open end, the first conductor being able to store information regarding articles to be managed and to transmit and receive the information, the first conductor being connected to a reader-writer device for communicating with the plurality of tags attached to the articles to be managed, and the first conductor being able to output electromagnetic waves, and a second antenna section including a second conductor one end of which is connected to a resistor for termination, an other end of which is an open end, which is opposite to the first conductor of the first antenna section with the plurality of tags attached to the articles to be managed therebetween, and which is not connected directly to the reader-writer device; and a guide which guides positions of the plurality of tags with respect to the antenna.

12. The tag communication apparatus according to claim 11, wherein:

the guide includes two side sections which are perpendicular to the first antenna section and which intersect with each other;

the first conductor is formed on the first antenna section near one end of an intersection of the two side sections; and the articles to be managed are piled so that corners of the articles to be managed near which the plurality of tags are attached are touching the intersection of the two side sections over the first antenna section, and the second antenna section can be placed at the time of communicating with the plurality of tags over the articles to be managed so that a corner of the second antenna section near which the second conductor is formed is touching the intersection of the two side sections.

13. The tag communication apparatus according to claim 11, wherein:

the guide is perpendicular to the first antenna section and includes a side section having a guide indicator which indicates positions at which the plurality of tags are to be placed;

the first conductor is formed on the first antenna section near the side section;

the plurality of tags are attached near sides of the articles to be managed;

the guide indicator extends from near the first conductor perpendicularly to the first antenna section; and the articles to be managed are piled so that the sides of the articles to be managed near which the plurality of tags are attached are touching the guide indicator over the first antenna section, and the second antenna section can be placed at the time of communicating with the plurality of tags over the articles to be managed so that a side of the second antenna section near which the second conductor is formed is touching the guide indicator of the side section.

14. The tag communication apparatus according to claim 11, wherein:

the guide includes a bottom section and a rear section which is perpendicular to the bottom section;

the first antenna section is perpendicular to the bottom section and the rear section;

the first conductor is formed on the first antenna section so that the first conductor is placed at first distance from the bottom section and at second distance from the rear section; and the second conductor is formed on the second antenna section so that the second conductor is placed at the first distance from a side of the second antenna section and so that the second conductor is placed at the second distance from a second side of the second antenna section perpendicular to the side, the plurality of tags are attached to the articles to be managed so that the plurality of tags are placed at the first distance from sides of the articles to be managed and so that the plurality of tags are placed at the second distance from second sides of the articles to be managed perpendicular to the sides, the articles to be managed are placed on the bottom section so that the second sides of the articles to be managed are touching the rear section, and the second antenna section can be placed on the bottom section from an opposite side of the first antenna section with the plurality of tags between at the time of communicating with the plurality of tags so that the second sides are touching the rear section.

15. The tag communication apparatus according to claim 11, wherein positions at which the plurality of tags are attached to the articles to be managed are indicated.

16. A reader-writer system comprising:
- a plurality of tags which can store information regarding articles to be managed and which can transmit and receive the information; and
- an antenna including:
    - a first antenna section which has a first conductor, supplies electric power to the plurality of tags, and transmits electromagnetic waves to and receives electromagnetic waves from the plurality of tags, one end of the first conductor being a feeding point, an other end of the first conductor being an open end, the first conductor being connected to a reader-writer device for communicating with the plurality of tags, and the first conductor being able to output electromagnetic waves, and
    - a second antenna section having a second conductor one end of which is connected to a resistor for termination, an other end of which is an open end, which is opposite to the first conductor of the first antenna section with the articles to be managed to which the plurality of tags are attached therebetween, and which is not connected directly to the reader-writer device.

* * * * *